United States Patent
Jalaparti et al.

(10) Patent No.: US 11,474,945 B2
(45) Date of Patent: Oct. 18, 2022

(54) CACHE AND I/O MANAGEMENT FOR ANALYTICS OVER DISAGGREGATED STORES

(71) Applicant: Microsoft Technology Licensing, LLC, Redmond, WA (US)

(72) Inventors: Virajith Jalaparti, Milpitas, CA (US); Sriram S. Rao, Saratoga, CA (US); Christopher W. Douglas, Mountain View, CA (US); Ashvin Agrawal, Cupertino, CA (US); Avrilia Floratou, Mountain View, CA (US); Ishai Menache, Redmond, CA (US); Srikanth Kandula, Redmond, WA (US); Mainak Ghosh, Foster City, CA (US); Joseph Naor, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/337,280

(22) Filed: Jun. 2, 2021

(65) Prior Publication Data

US 2021/0286728 A1 Sep. 16, 2021

Related U.S. Application Data

(63) Continuation of application No. 16/660,554, filed on Oct. 22, 2019, now Pat. No. 11,055,225.

(60) Provisional application No. 62/909,055, filed on Oct. 1, 2019.

(51) Int. Cl.
*G06F 12/0862* (2016.01)
*H04L 67/1097* (2022.01)
*G06F 12/0868* (2016.01)
*G06F 12/0891* (2016.01)

(52) U.S. Cl.
CPC ...... *G06F 12/0862* (2013.01); *G06F 12/0868* (2013.01); *G06F 12/0891* (2013.01); *H04L 67/1097* (2013.01)

(58) Field of Classification Search
None
See application file for complete search history.

(56) References Cited

U.S. PATENT DOCUMENTS 7,130,890 B1 * 10/2006 Kumar ............... H04L 67/56
 713/400

\* cited by examiner

*Primary Examiner* — Brian R Peugh
(74) *Attorney, Agent, or Firm* — Fiala & Weaver P.L.L.C.

(57) ABSTRACT

Methods, systems, apparatuses, and computer program products are provided for prefetching data. A workload analyzer may identify job characteristics for a plurality of previously executed jobs in a workload executing on a cluster of one or more compute resources. For each job, identified job characteristics may include identification of an input dataset and an input bandwidth characteristic for the input dataset. A future workload predictor may identify future jobs expected to execute on the cluster based at least on the identified job characteristics. A cache assignment determiner may determine a cache assignment that identifies a prefetch dataset for at least one of the future jobs. A network bandwidth allocator may determine a network bandwidth assignment for the prefetch dataset. A plan instructor may instruct a compute resource of the cluster to load data to a cache local to the cluster according to the cache assignment and the network bandwidth assignment.

20 Claims, 7 Drawing Sheets

CACHE AND I/O MANAGEMENT FOR ANALYTICS OVER DISAGGREGATED STORES

CROSS-REFERENCE TO RELATED APPLICATIONS

This application is a continuation of U.S. application Ser. No. 16/660,554, filed Oct. 22, 2019, entitled "Cache and I/O Management for Analytics over Disaggregated Stores," currently allowed, which claims the benefit of U.S. Provisional Patent Application. No. 62/909,055, filed on Oct. 1, 2019, titled "Cache and I/O Management for Analytics over Disaggregated Stores," the entireties of which are hereby incorporated by reference herein.

BACKGROUND

In many modern cloud architectures, a set of nodes (which collectively may make up a compute or computing cluster) may be configured to carry out operations on data stores in the cloud. Such operations may comprise, for instance, analytical operations performed by a distributed system on large volumes of data. In many instances, the compute cluster which carries out complex operations may not be collocated with the storage resources that store the data to be analyzed. For instance, the compute cluster may need to access significant amounts of data from a data store over a network. However, because the transfer of data is typically slower than operations performed on the data, the transfer of data over the network can result in a bottleneck for the compute cluster, which may reduce the overall efficiency of performing operations and lead to missed job execution deadlines.

In some solutions, data from the remote data stores may be cached by the compute cluster to increase the speed at which operations may be performed. However, even in such solutions, inefficiencies still may be prevalent due to a number of other factors, such as the variability in network bandwidth between the compute cluster and the data store and the variability in workloads executed by the compute cluster. Furthermore, the size of the cache local to a compute cluster is also limited, which may also hinder the ability to cache data in an effective manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for prefetching data. A workload analyzer may identify job characteristics for a plurality of previously executed jobs in a workload executing on a cluster of one or more compute resources. For each of the jobs, identified job characteristics may include identification of an input dataset and an input bandwidth characteristic for the input dataset. A future workload predictor may identify a plurality of future jobs expected to execute on the cluster based at least on the identified job characteristics. A cache assignment determiner may determine a cache assignment that identifies a prefetch dataset for at least one of the future jobs, and a network bandwidth allocator may determine a network bandwidth assignment for the prefetch dataset. A plan instructor may be configured to instruct a compute resource of the cluster to load data to a cache local to the cluster according to the cache assignment and the network bandwidth assignment. In this manner, data may be located to the cache in an intelligent fashion, thereby improving the performance of the compute cluster.

Further features and advantages, as well as the structure and operation of various embodiments, are described in detail below with reference to the accompanying drawings. It is noted that the disclosure is not limited to the specific embodiments described herein. Such example embodiments are presented herein for illustrative purposes only. Additional example embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
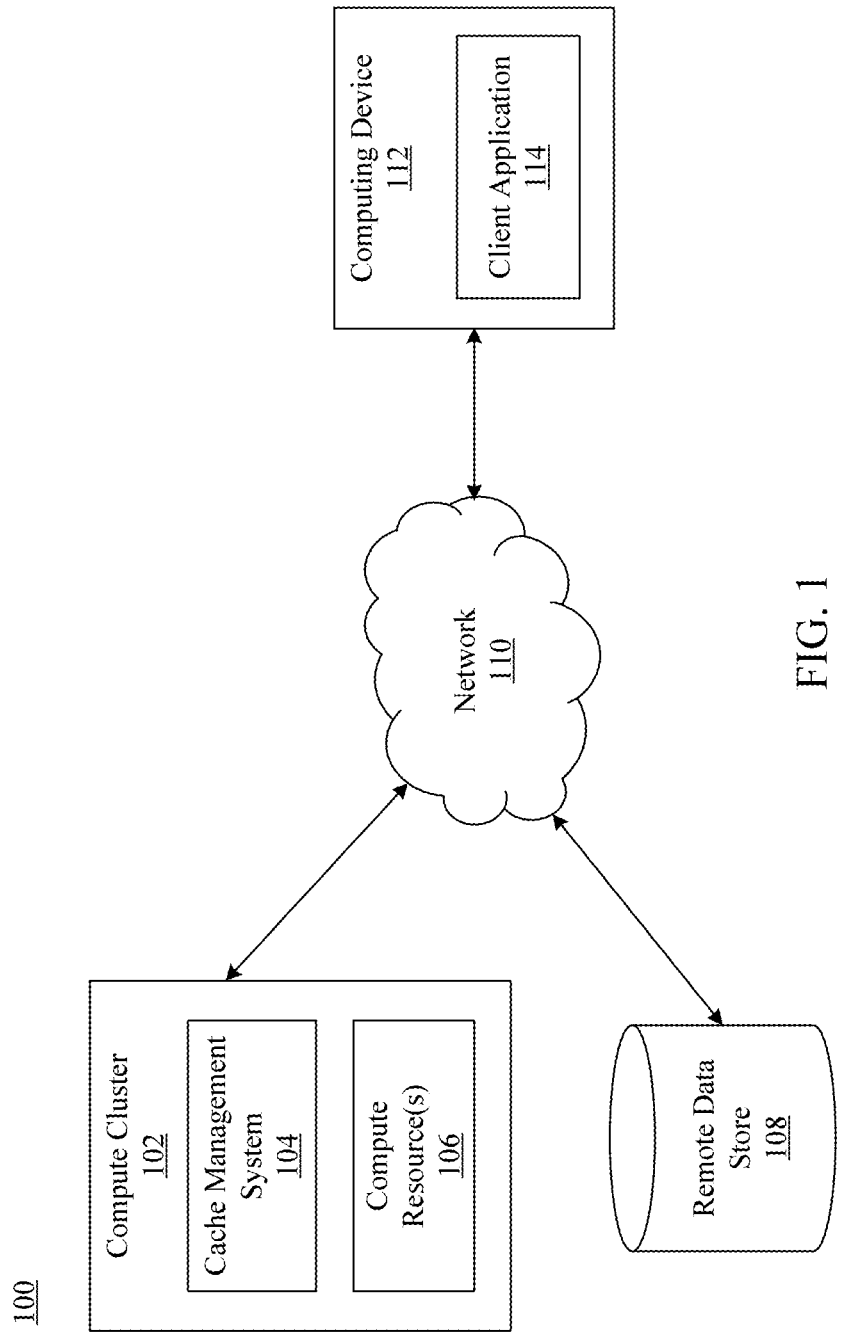
FIG. 1 shows a block diagram of a system for managing the cache of a compute cluster, according to an example embodiment.

The features and advantages will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features described herein. The scope of the disclosure is not limited to the disclosed embodiments. The disclosed embodiments merely illustrate features described herein, and modified versions of the disclosed embodiments are also encompassed by the disclosure. Example embodiments of the disclosure are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous example embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

In many modern cloud architectures, a set of nodes (which collectively may make up a compute or computing cluster) may be configured to carry out operations on data stores in the cloud. Such operations may comprise, for instance, analytical operations performed by a distributed system on large volumes of data. In many instances, the compute cluster which carries out complex operations may not be collocated with the storage resources that store the data to be analyzed. For instance, the compute cluster may need to access significant amounts of data from a data store over a network. For example, in some public clouds, the compute resources (e.g., compute clusters) may be physically separated from the storage resources, such as where the compute resources are implemented one or more virtual machines in a compute tier, while the storage of data may be performed in a separate storage layer. However, because the transfer of data is typically slower than operations performed on the data, the transfer of data over the network can result in a bottleneck for the compute cluster, which may reduce the overall efficiency of performing operations and lead to missed job execution deadlines. In other words, since data-parallel analytics frameworks are often built with an assumption that the storage resources are collocated with the compute resources, the disaggregation between the storage and compute resources existing in public clouds may result in a bottleneck that may delays jobs and increase their performance variability (e.g., increase the unpredictability in job execution times).

In some solutions, data from the remote data stores may be cached by the compute cluster to increase the speed at which operations may be performed. However, even in such solutions, inefficiencies still may be prevalent due to a number of other factors, such as the variability in network bandwidth between the compute cluster and the data store and the variability in workloads executed by the compute cluster. Furthermore, the size of the cache local to a compute cluster is also limited, which may also hinder the ability to cache data in an effective manner. In addition, such techniques to attempt to mitigate the storage-compute resource bottleneck are typically reactive and fail to consider job-level objectives (e.g., job deadlines, job structures, etc.). For instance, where a cache on the compute resources may be maintained on a local memory, SSD (solid state drive), or disks with cache replacement policies, job-level objectives still may not be met. For example, if a particular job joins two inputs, caching a single one of the inputs may not result improved performance of the job, since the second input would still need to be obtained during execution. Furthermore, such techniques often have a poor cache hit rate (e.g., the rate at which cached data is actually utilized by the compute cluster) because prior workloads may not be appropriately evaluated and analyzed.

Embodiments described herein address these and other issues by providing techniques for prefetching data in an intelligent manner. In an example system, job characteristics may be identified for a plurality of previously executed jobs in a workload (e.g., by analyzing a history that contains information for the previously executed jobs). The job characteristics can include various information and/or metrics, such as job-level details (e.g., the types of operations, input datasets, the time at which a job, a bandwidth characteristic for the input datasets, etc.). Based at least on the job characteristics, an identity of future jobs expected to execute on a compute cluster may be determined. In other words, future jobs may be attempted to be predicted. For one (or more) of the future jobs, a prefetch dataset may be identified (e.g., an input dataset that is expected to be utilized for the future job). In some examples, a network bandwidth assignment may also be determined for the prefetch dataset. A compute resource of the cluster may be instructed to load data to a cache local to the cluster according to the cache assignment and the network bandwidth assignment.

Intelligently prefetching data in a compute cluster in this manner has numerous advantages, including improving performance of the compute cluster. For instance, by allowing compute resources of the compute cluster to prefetch data (which can often be large volumes of data depending on the job being executed) may allow the compute cluster to perform operations on the data with reduced latency, since the data may already be present in a local cache, rather than obtaining the data during job execution (which can result in a bottleneck). In this manner, the impact of network bandwidth issues, such as low network bandwidth or variability in network bandwidth, may be reduced, enabling the compute cluster to perform operations quicker and meet a greater number of job deadlines compared to other techniques.

Furthermore, because network bandwidth is typically not unlimited between a compute cluster and a data store, implementations described herein may enable prefetching of data in a manner that appropriately allocates a total available bandwidth to one or more prefetch datasets (e.g., by assigning each prefetch dataset a particular allocation, a time at which the dataset should be obtained, etc.). As a result, network resources, such as the network connection between the compute and storage resources, may be effectively managed based on the available bandwidth, thereby improving performance of the network coupling the compute and storage resources.

Still further, the cache space local to the compute resources may also utilized in a more efficient manner. For instance, because the cache space is typically limited in size, implementations described herein may further identify a schedule that indicates a time at which a prefetch dataset should be obtained, as well as a time that the dataset should be evicted. The cache space may therefore be efficiently utilized by allowing the prefetch dataset to be present in the cache only during the times that it is expected to be utilized, allowing the limited space to be available for other prefetch datasets.

Example embodiments are described as follows for systems and methods for prefetching data. For instance, FIG. 1 shows a block diagram of a system 100 for managing a data cache for a compute cluster, according to an example embodiment. As shown in FIG. 1, system 100 includes a compute cluster 102, a remote data store 108, and a computing device 112, which are communicatively coupled by a network 110. As shown in FIG. 1, compute cluster 102 includes a cache management system 104 and compute resource(s) 106. Computing device 112 includes a client application 114. Remote data store 108 may be located remotely from compute cluster 102 in example embodiments. System 100 may comprise any number of compute clusters, computing devices, and/or data stores, including those illustrated in FIG. 1 and optionally one or more further devices or components not expressly illustrated. System 100 is further described as follows.

Network 110 may include one or more of any of a local area network (LAN), a wide area network (WAN), a personal area network (PAN), a combination of communication networks, such as the Internet, and/or a virtual network. In example implementations, compute cluster 102, remote data store 108, and/or computing device 112 may be communicatively coupled to each other via network 110. In an implementation, any one or more of compute cluster 102, remote data store 108, and/or computing device 112 may communicate via one or more application programming interfaces (API), such as a Representation State Transfer (REST) API, and/or according to other interfaces and/or techniques. Compute cluster 102, remote data store 108, and/or computing device 112 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device 112 may comprise any device or collection of devices for receiving and/or processing operations, such as user-generated operations. For instance, computing device 112 may include a computing device of one or more users (e.g., individual users, family users, enterprise users, governmental users, etc.) that may comprise one or more applications, operating systems, virtual machines, storage devices, etc. that may be used to access and/or analyze data (e.g., database data or other data) that may be stored locally and/or remotely (e.g., in remote data store 108). In some examples, computing device 112 may access one or more server devices, such as compute resources(s) 106 of compute cluster 102, to access and/or analyze such data. Computing device 112 may include any number of computing devices, including tens, hundreds, thousands, millions, or even greater numbers of computing devices. Computing device 112 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 112 is not limited to a physical machine, but may include other types of machines or nodes, such as a virtual machine (VM). Computing device 112 may interface with other devices (e.g., server devices) through one or more application programming interfaces (APIs) and/or by other mechanisms. Note that any number of program interfaces may be present.

In examples, computing device 112 may include one or more applications, such as client application 114. Client application 114 may comprise any application that may be used to access and/or analyze data that may be located locally or remotely. In some implementations, client application 114 may provide an interface through which a user may generate operation requests to analyze data, provide such operation requests to compute cluster 102 to execute, and display the results of executions on computing device 112. In some example embodiments, client application 114 may comprise an application for providing Structured Query Language (SQL) queries for execution. For instance, client application 114 may comprise a database application that may be used to store, retrieve, and/or analyze database information through generation of one or more SQL queries, such as for analyzing past data (e.g., sales information), predicting future data, etc. This example is not intended to be limiting, and client application 114 may include any other application that may enable a user to access data and/or operations performed thereon (e.g., by compute cluster 102). Client application 114 may be installed locally on computing device 112 or may be located on a separate computing device or node (e.g., virtual machine or the like). For instance, client application 114 may comprise an end-user application, which may comprise one or more locally installed software packages, software as a service (SaaS) packages, and/or platform as a service PaaS) packages, web applications, etc. that may be used to access information. For instance, client application 114 may include software relating to data analytics, databases, business intelligence, or any other software for accessing content stored in any local or remote storage device as described herein.

Remote data store 108 may include any type of information that may be analyzed for various purposes (e.g., data analytics, business intelligence, sales analysis, manufacturing, etc.). Remote data store 108 may store information in any appropriate manner and in any structure, including in a structured database, an unstructured form, as electronic files, databases, tables, etc. Remote data store 108 may also store information in any one or more file systems, and is not limited to any particular format. Non-limiting examples of information that may be stored in remote data store include company records, business transactions, personal information, educational information, health information, professional information, organizational or company information, banking or other financial records, legal information, sensor data, network information, biographic information such as birth certificates, driver's licenses, passports, etc.

Remote data store 108 may comprise one or more local or on-premise storage devices, such as physical storage devices (e.g., hard disk drives, flash drives, solid-state drives, optical disk drives, RAM devices, etc.) and/or one or more cloud-based storages. In some examples, remote data store 108 may store information in a secure manner, such as via password protection, encryption (e.g., public and private key encryption, symmetric keys, etc.), or any other secure manner as appreciated by those skilled in the relevant arts. In some examples, remote data store 108 may comprise a number of data stores that are distributed (e.g., geo-distributed) across a plurality of locations. For instance, a particular organization may have data stores serving different locations, subsidiaries, services, etc. of the organization. In some examples, remote data store 108 may include a plurality of data stores that may be unrelated and/or unaffiliated with each other, such as data stores managed by different service providers, data stores for storing different types of assets, data stores for serving different clients (e.g., subscribers), etc.

Remote data store 108 may comprise any number of assets. For instance, remote data store 108 may comprise assets in the thousands, millions, or even billions of assets across a plurality of file systems, file shares, storage devices, etc. In some examples, remote data store may comprise assets arranged in any combination of drives, folders, subfolders, or other grouping as appreciated by those skilled in the relevant arts. In some example embodiments, assets 114A-114N may be part of one or more "blob" storages, such as Azure Blob storage developed by Microsoft Corporation of Redmond, Wash. A blob storage may be configured to store any type of unstructured data in one or more containers, such as databases, documents, images, videos, etc. A blob storage as described herein may comprise a local storage device and/or a remotely located storage (e.g., a cloud-based storage) to which assets may be uploaded, accessed, downloaded, modified, deleted, etc. While remote data store 108 may store information in files in some examples, it is understood that such files (or other data structure) may comprise a number of "blocks" that may be located either on the same storage device and/or across a plurality of storage devices (e.g., in a cloud-based storage).

Compute cluster 102 may comprise any number of servers, such as a network-accessible server (e.g., a cloud computing server network). For example, compute cluster 102 may comprise a group or collection of servers (e.g., computing devices) that are each accessible by a network such as the Internet (e.g., in a "cloud-based" embodiment) to store, manage, and/or process data. Compute cluster 102 may comprise any number of computing devices, and may include any type and number of other resources, including resources that facilitate communications with and between the servers, storage by the servers, etc. (e.g., network switches, storage devices, networks, etc.). Servers of compute cluster 102 may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, servers of compute cluster 102 may be co-located (e.g., housed in one or more nearby buildings with associated components such as backup power supplies, redundant data communications, environmental controls, etc.) to form a datacenter, or may be arranged in other manners. Accordingly, in an embodiment, compute cluster 102 may be a datacenter in a distributed collection of datacenters.

As shown in FIG. 1, compute cluster 102 includes cache management system 104 and compute resource(s) 106. Cache management system 104 may be configured to manage a cache local to compute cluster 102 that may be utilized by compute resource(s) 106 when performing operations. For instance, compute resource(s) 106 may execute one or more jobs (e.g., an arithmetic or other data processing operations on data obtained from remote data store 108, such as an operation or set of operations in response to a user command generated at client application 114). In some implementations, compute resource(s) 106 may be configured to execute a plurality of jobs (e.g., jobs generated at a plurality of different computing devices). In such instances, compute resource(s) 106 may be implemented on one or more computing nodes of compute cluster 102 (e.g., virtual machines), such that jobs may be executed in a distributed and/or parallel fashion for improved performance.

In example embodiments, compute resource(s) 106 may be configured to perform analytical processing operations on data stored in remote data store 108 located remote from compute resource(s) 106. For instance, compute resource(s) 106 may obtain data on which operations are to be performed from remote data store 108 via network 110 prior to performing such operations. As will be described in greater detail below, cache management system 104 may be configured to instruct compute resource(s) 106 of compute cluster 102 to prefetch data from remote data store 108 to further improve performance of compute cluster 102. In an example implementation, cache management system 104 may analyze previously executed jobs in a workload executing on compute cluster 102 to determine job characteristics for each job, such as an input dataset and an input dataset bandwidth characteristic. Cache management system 104 may identify a plurality of future jobs expected to execute on compute cluster 102, and determine a cache assignment that identifies a prefetch dataset for at least one of the future jobs and a network bandwidth assignment for the prefetch dataset. In accordance with the cache assignment and the network bandwidth assignment, cache management system 104 may instruct one or more compute resource(s) 106 of compute cluster 102 to prefetch data from remote data store 108. In this manner, compute resource(s) 106 of compute cluster 102 may be enabled to perform operations on data that have already been transferred to a cache local to the compute cluster, thereby improving the performance of compute cluster 102.

It is noted and understood that implementations are not limited to the illustrative arrangement shown in FIG. 1. Rather, system 100 comprise any number of computing devices and/or servers coupled in any manner. For instance, though compute cluster 102, remote data store 108, and computing device 112 are illustrated as separate from each other, any one or more of such components (or subcomponents) may be co-located, located remote from each other, may be implemented on a single computing device or server, or may be implemented on or distributed across one or more additional computing devices not expressly illustrated in FIG. 1.

Figure 2:
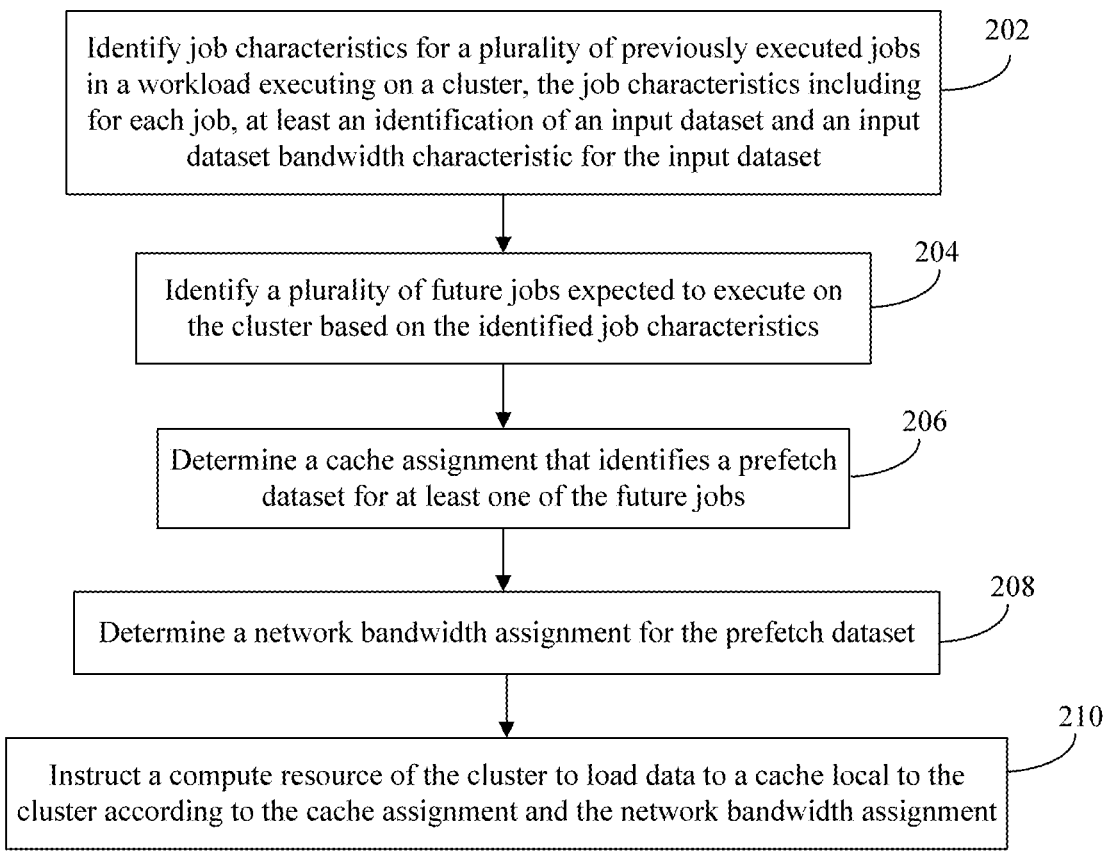
FIG. 2 shows a flowchart of a method for prefetching data, according to an example embodiment.

Cache management system 104 may operate in various ways to enable compute resource(s) 106 of compute cluster 102 to prefetch data from remote data store 108. For instance, cache management system 104 may operate according to FIG. 2. FIG. 2 shows a flowchart 200 of a method for prefetching data, according to an example embodiment. For illustrative purposes, flowchart 200 and cache management system 104 are described as follows with respect to FIG. 3.

Figure 3:
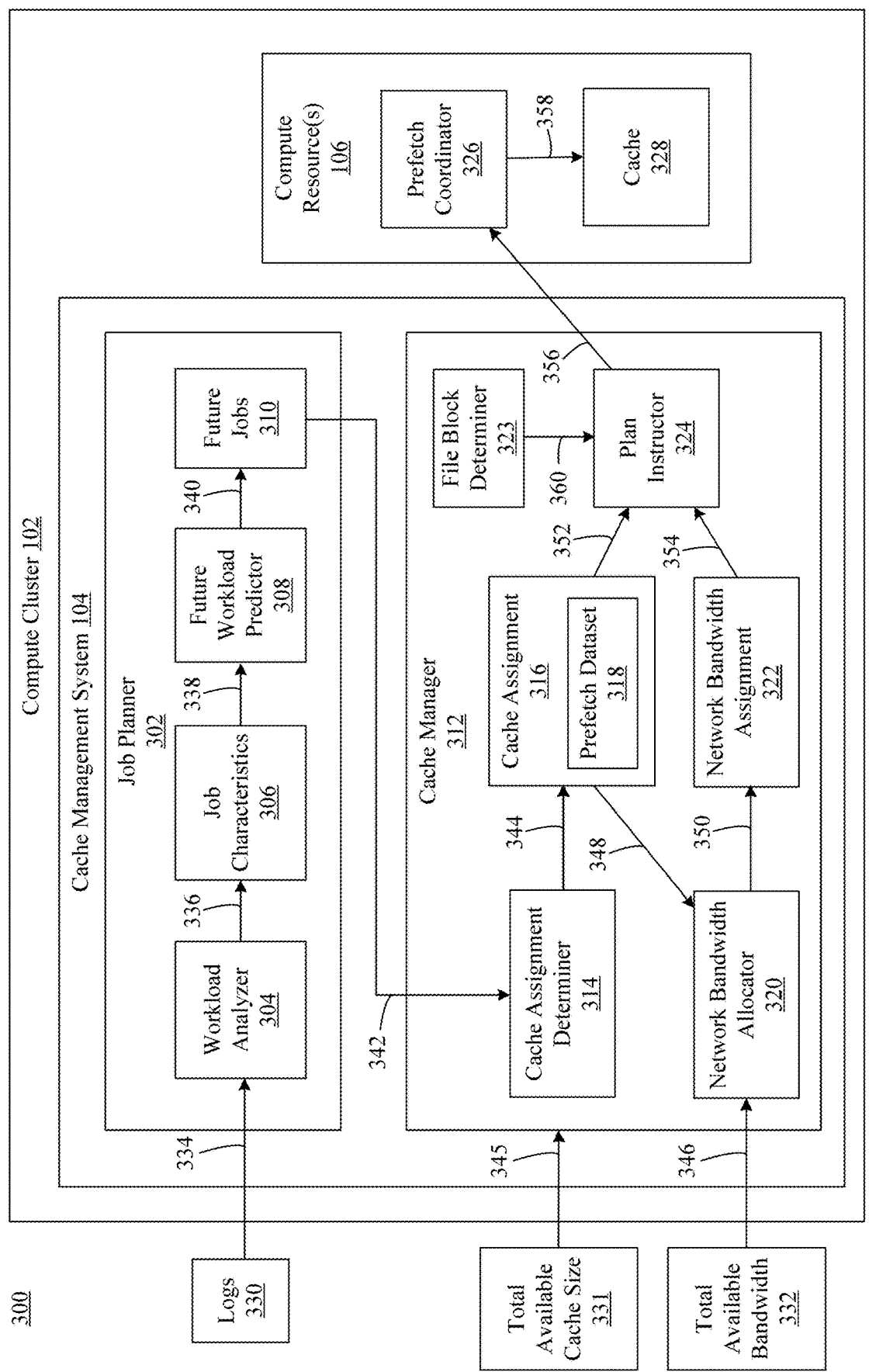
FIG. 3 shows a block diagram of an example cache management system, according to an example embodiment.

FIG. 3 shows a block diagram of an example cache management system, according to an example embodiment. As shown in FIG. 3, system 300 includes an example implementation of compute cluster 102, logs 330, a total available cache size 331, and a total available bandwidth 332. Compute cluster 102 includes an example implementations of cache management system 104 and compute resource(s) 106. As shown in FIG. 3, cache management system 104 includes a job planner 302 and a cache manager 312. Job planner 302 includes a workload analyzer 304, job characteristics 306, future workload predictor 308, and future jobs 310. Cache manager 312 includes a cache assignment determiner 314, a cache assignment 316 that includes a prefetch dataset 316, a network bandwidth allocator 320, a network bandwidth assignment 322, a file block determiner 323, and a plan instructor 324. Compute resource(s) 106 includes a prefetch coordinator 326 and a cache 328. Flowchart 200 and system 300 are described in further detail as follows.

Flowchart 200 of FIG. 2 begins with step 202. In step 202, job characteristics are identified for a plurality of previously executed jobs in a workload executing on a cluster, the job characteristics including for each job, at least an identification of an input dataset and an input dataset bandwidth characteristic for the input dataset. For instance, with reference to FIG. 3, workload analyzer 304 of job planner 302 may obtain 334 logs 330 that comprise information associated with a plurality of previously executed jobs in a workload executing on a cluster of one or more compute resource(s) 106. As used herein, a job may comprise any number of tasks or operations performed by one or more compute resource(s) 106 of compute cluster 102, such as data processing, data reading, and/or data writing operations using any appropriate storage device, such as remote data store 108. For instance, a job may comprise a set of operations to process data obtained from remote data store 108 and persist the results of such operations to the data store or other storage device. A workload may include a plurality of jobs (e.g., by the same or different user, organization, team within an organization, etc.) executing on compute resource(s) 106. Compute resource(s) 106 may comprise, for instance, one or more computing nodes (e.g., VMs) for obtaining data from remote data store 108, optionally caching such data, processing the data, and/or providing the results of such processing to another entity (e.g., back to remote data store 108, to client application 114, etc.). In examples, upon executing a job, information and/or metrics associated with the job may be logged (e.g., automatically) and stored in logs 330, which may be collocated with compute cluster 102 and/or located remotely.

Logs 330 may indicate various aspects related to each previously executed job, including but not limited to one or more input datasets for the job (i.e., what inputs, such as a files, databases, etc., inputs were read by operations in the job), the time at which the job executed, the time at which the job completed execution, the frequency of execution, the amount of time that the job took to execute on compute resource(s) 106 of compute cluster 102, the amount of time for the input datasets to be obtained by compute resource(s) 106 during execution of the job, bandwidth characteristics for the input data set, such as the rate at which one or more of the input datasets (or files, databases, etc. contained therein) were transferred, read, and/or processed by compute resource(s) 106 from remote data store 108 and/or the volume of data transferred between remote data store 108 and compute resource(s) 106 for the job, the number of computing nodes performing operations in the job, the types of operations (e.g., identification of CPU processes, logical and/or physical operators, etc.).

In some further examples, workload analyzer 304 may be configured to derive one or more metrics from information contained in logs 330, such as a rate of processing data obtained from remote data store 108. For instance, where a job comprises one or more stages and logs 330 indicates a total time for processing the job and an amount of data read by the stage, an average rate of processing of each stage may be determined by dividing the amount of data read in each stage by the time to execute the stage. In this manner, workload analyzer 304 may determine the rate at which a given stage may be consuming data from remote data store 108, which may help determine the input/output (I/O) intensity for each stage of a job (e.g., whether a stage of a job is compute bound and/or I/O bound). These examples are only illustrative, and workload analyzer 306 may obtain and/or derive any other information and/or metrics from logs 330 associated with previously executed jobs on one or more compute resource(s) 106.

Accordingly, in implementations, workload analyzer 304 may be configured to analyze logs 330 to identity 336 job characteristics 306 that includes, for each of a plurality of previously executed jobs, characteristics associated with each job. In other words, workload analyzer 304 be configured to analyze logs 330 to generate job characteristics 306 for the plurality of jobs.

In some example embodiments, workload analyzer 304 may be configured to identify job characteristics 306 for each of the plurality of previously executed jobs in an offline manner. For instance, workload analyzer 304 may be configured to identify job characteristics 306 from logs 330 that comprise historical information for a workload production offline or prior to instructing one or more compute resource(s) 106 to prefetch data.

In some implementations, workload analyzer 304 may analyze logs 330 and identify job characteristics 306 for one or more planning windows, such as a 1-hour, 2-hour, 6-hour, 24-hour, etc. planning window. For instance, cache management system 104 may be configured to generate a cache plan according to implementations described herein corresponding to each planning window, such that the appropriate data may be obtained by compute resource(s) 106 prior to a time that jobs expected to read such data in each planning window. In such examples, job characteristics 306 may therefore be based on such a time window that may be predetermined and/or dynamic (e.g., dynamically changing planning windows based on lower or higher demands).

In step 204, a plurality of future jobs expected to execute on the cluster are identified based at least on the identified job characteristics. For instance, with reference to FIG. 3, future workload predictor 308 may be configured to identify 340 future jobs 310. Future jobs 310 may comprise, for example, a set of future jobs that are expected to execute on compute cluster 102. For instance, future workload predictor 308 may identify future jobs 310 based on a number of factors, such as job characteristics 306.

In some examples, future workload predictor 308 may be configured to detect patterns in jobs (e.g., how often jobs occur, when they occur, etc.) by obtaining 338 job characteristics 306 using one or more techniques, such as linear interpolation. For instance, job characteristics 306 indicated that one or more jobs ran at certain times and/or days in the past, future workload predictor 308 may identify future jobs 310 that includes one or more similar jobs expected to run in the future, with similar job characteristics (e.g., the same or similar input datasets, processing rates, etc.). In some implementations, job characteristics 306 may comprise job characteristics for jobs executed in any one or more suitable time windows (e.g., planning windows as described) such as characteristics for jobs in the past hour, day, week, month, etc. As an example, job characteristics 306 indicated that a particular job is executed daily at 1:00 pm using an input dataset that comprises the past 24 hours of data (e.g., sales data in the most recent 24 hour period), future workload predictor 308 may determine that a similar job is expected to run at 1:00 pm each day in the future, where each of those jobs reads the most recent 24 hours of sales data. This is only an illustrative example, and other examples are also contemplated.

In step 206, a cache assignment that identifies a prefetch dataset for at least one of the future jobs is determined. For instance, with reference to FIG. 3, cache assignment determiner 314 of cache manager 312 may be configured to determine 344 cache assignment 316 in response to obtaining 342 future jobs 310. Cache assignment 316 may identify prefetch dataset 318 in examples. Prefetch dataset 318 may comprise an identification of one or more input datasets for at least one of future jobs 310. For instance, if future jobs 310 indicated that a particular job is expected to be executed by compute cluster 102 with a particular set of input files, cache assignment determiner 314 may determine cache assignment 316 that includes prefetch dataset 318 for the particular job, where prefetch dataset 318 may indicate which one or more files of the input dataset for the job should be prefetched. In implementations, cache assignment determiner 314 may also be configured to obtain 345 total available cache size 331 that indicates a size of cache 328 in determining cache assignment 316. This is only one example, and cache assignment determiner 314 may also take into account one or more other constraints when determining a suitable cache assignment, as described in greater detail below.

In examples, cache assignment determiner 314 may implement a linear program (LP), described in greater detail below, to identify prefetch dataset 318. The LP may be executed at any suitable time, such as during each planning window (e.g., each hour, 6 hours, day, week, etc.). In some implementations, the LP may also be executed aperiodically and/or may be user-initiated.

In implementations, the LP may be configured to identify which datasets should be prefetched for one or more future jobs, as well as identify one or more associated characteristics, such as a time at which the dataset (or files contained therein) should be obtained from remote data store 108 and placed in cache 328, a time at which the dataset (or files contained therein) should be evicted from cache 328 (e.g., to make room for other datasets that may be scheduled to be prefetched, other datasets that are determined not to be prefetched, and/or datasets utilized by ad hoc jobs). As described below, the LP may also be configured to identify a bandwidth for obtaining prefetch dataset 318 from remote data store 108, such that total available bandwidth 332 may be appropriate allocated across jobs executing on compute cluster 102.

In some implementations, the LP may generate cache assignment 316 that includes prefetch dataset 318 based on service level objectives (e.g., job deadlines), an expected job arrival time, a job frequency, the number of jobs and/or stages within each job, or any other characteristics described herein for one or more of future jobs 310. In some examples, the LP may be biased to generating cache assignment 316 that includes a prefetch dataset for one or more of future jobs 310 that have job stages with elevated I/O rates or other indicators that suggest that an I/O bottleneck (e.g., a bandwidth restriction) exists that may be remedied by prefetching some or all of the input datasets for the job.

Accordingly, the LP may take as inputs, one or more of future jobs 310 that may identify which jobs are expected to run on compute cluster 102 during a given time period (e.g., a planning window, such as the next 6 hours), characteristics associated future jobs 310 (e.g., identification of input sets, processing speeds of stages within each job, etc., and total available bandwidth 322. In implementations, based at least on various constraints described in greater detail below (e.g., total available cache size 331, the total available bandwidth 322, identification of the input datasets for future jobs 310, etc.), the LP may output cache assignment 316 that identifies which datasets should be prefetched for one or more of future jobs 310, the time at which the datasets should be prefetched, the time at which the dataset should be evicted from cache 328, and/or a bandwidth at which the dataset should be transferred from remote data store 108.

In this manner, cache assignment 316 may be configured to generate cache assignment for compute cluster 102 that indicates a prefetch dataset 318 for one or more of future jobs 310 (or a plurality of prefetch datasets across a plurality of future jobs 310). In examples, such a cache assignment may enable prefetch coordinator 326 of compute resource(s) 106 of compute cluster 102 to optimize the manner in which data may be obtained from remote data store 108 to improve performance of the operations on the compute cluster, such as increasing the number of jobs that meet their deadlines and optimizing the network traffic that communicatively couples resources of compute cluster 102 to remote data store 108.

In step 208, a network bandwidth assignment for the prefetch dataset is determined. For instance, with reference to FIG. 3, network bandwidth allocator 320 may be configured obtain 348 information associated with prefetch dataset 318 and determine 350 network bandwidth assignment 322 for the prefetch dataset. Network bandwidth assignment 322 may indicate, for example, an allocation of bandwidth to one or more files identified in prefetch dataset 318. In some implementations, network bandwidth assignment 322 may identify a rate of transfer for one or more files contained in prefetch dataset 318.

In some implementations, as described herein, network bandwidth allocator 320 may implement a LP to determine network bandwidth assignment 322. In some example embodiments, cache assignment determiner 314 and network bandwidth allocator 320 (and/or job planner 302) may be implemented by the same LP, although implementations are not limited to such an approach. In some embodiments, such components or subcomponents may also be implemented in other ways (e.g., techniques other than an LP) as will be appreciated to those skilled in the relevant arts.

Network bandwidth allocator 320 may obtain 346 total available bandwidth 322 in determining the appropriate network bandwidth assignment for any particular prefetch dataset (or files contained therein). For instance, total available bandwidth 332 may indicate the amount of I/O bandwidth (e.g., network bandwidth in some implementations) between compute cluster 102 and remote data store 108. In some instances, total available bandwidth 322 may be constant, while in other instances, the total available bandwidth may change during a time period (e.g., based on a time of day). Network bandwidth allocator 320 may be configured to allocate a subset of total available bandwidth 322 to prefetch dataset 318, and store such an allocation in network bandwidth assignment 322. Network bandwidth allocator 320 may perform such an allocation in various ways as described herein, such as by allocating total available bandwidth 332 in a manner that maximizes performance of compute cluster 102, optimizing the amount of traffic over network 110 at any given time, etc.

In step 210, a compute resource of the cluster is instructed to load data to a cache local to the cluster according to the cache assignment and the network bandwidth assignment. For instance, with reference to FIG. 3, plan instructor 324 may be configured to obtain 352 cache assignment 316 and obtain 354 network bandwidth assignment 322, and instruct 356 prefetch coordinator 326 to load data (e.g., as identified by prefetch dataset 318) according to cache assignment 316 and network bandwidth assignment 322. For instance, plan instructor 324 may instruct prefetch coordinator 326 of one or more of compute resource(s) 106 to load 358 data identified in prefetch dataset 318 to cache 328 local to compute cluster 102 at a particular rate identified in network bandwidth assignment.

Cache 328 may comprise any type of storage device that may be collocated with compute cluster 102. For instance, cache 328 may comprise one or more disks, hard disk drives, solid-state devices (SSDs), random access memory (RAM) devices, etc. Cache 328 may also comprise one or more tiers or levels, such as L1 (e.g., on chip), L2 (on-chip, but slower than L1 cache), main memory (e.g., RAM), and/or any other tiers, as appreciated by those skilled in the relevant arts. In some implementations, cache 328 may be distributed across a plurality of nodes of compute cluster 102, such as in a distributed file system (DFS).

During processing operations, compute resource(s) 106 of compute cluster 102 may be configured to execute jobs (e.g., by executing each task that makes up a job) in a workload. Compute resource(s) 106 may comprise, for instance, a plurality of machines, including but not limited to physical machines, virtual machines, nodes, etc. Compute resource(s) 106 may also comprise a plurality of cores (e.g., hundreds, thousands, etc.) that may be configured to execute such tasks.

In examples, compute resource(s) 106 may access data from cache 328 via an appropriate communication channel (e.g., a bus, serial ATA (SATA) connection, parallel cable connection, etc.) and/or from remote data store 108 via network 110. For instance, where prefetch coordinator 326 has prefetched data for a particular job based on an instruction from plan instructor 324 and stored the prefetched data in cache 328, compute resource(s) 106 may be configured to read the prefetched data from cache 328 during execution of the job (rather than reading the data from remote data store 108 which may increase the latency), thereby improving the efficiency at which the job may be executed. In such examples, compute resource(s) 106 may attempt to read the data first from a cache tier with the lowest latency (e.g., L1 cache), then the next slowest latency (e.g., L2 cache) and so on until the appropriate input dataset for the job is located.

If not located in cache 328, compute resource(s) 106 may read the data from one or more remote sources, such as remote data store 108. For instance, compute resource(s) 106 may also be configured to read data directly from remote data store 108, such as where cache assignment determiner 314 determines that one or more datasets for a future job need not be prefetched (e.g., where the prefetch dataset may be relatively small in size, space limitations in cache 328, or any other constraints described herein).

In other examples, compute resource(s) 106 may also obtain one or more datasets from remote data store 108 where the compute resource(s) execute jobs that were not predicted to execute on the cluster (e.g., ad hoc jobs). For instance, while future workload predictor 308 may attempt to predict future jobs based on job characteristics 306 extracted from logs 330, a user may submit an ac hoc job for execution by one or more of compute resource(s) 106 that is not included in future jobs 310. In such instances, compute resource(s) 106 may be configured to read data from remote data store 108 without prefetch coordinator 326 prefetching such data in advance of the job.

By instructing compute resource(s) 106 to prefetch certain datasets with an allocated bandwidth in the described manner, cache management system 104 may enable compute cluster 102 to improve performance (e.g., by meeting an increased number of job deadlines), while also optimizing network traffic between compute cluster 102 and remote data store 108. In other words, techniques described herein enable a joint network and cache optimization for workloads running in the cloud based on a number of factors and constraints, such as the available bandwidth, the jobs expected to run in the cloud for a given time period, the inputs to each job, the size of the cache local to the compute cluster, etc. Using such techniques, cache 328 may be populated with datasets prior to compute resource(s) of compute cluster 102 executing a job that reads such datasets, reducing the latency in executing the job. Furthermore, as described herein, cache management system 104 may also generate a schedule identifying when datasets should be obtained and when they should be evicted, allowing for more granular management of cache 328 to even further improve performance.

Figure 4:
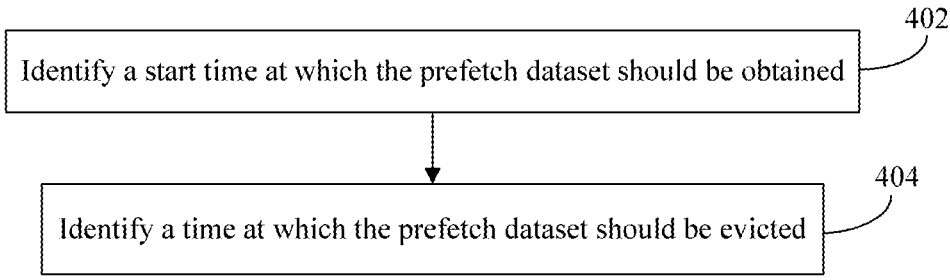
FIG. 4 shows a flowchart of a method for implementing a schedule in a cache assignment, according to an example embodiment.

In some example embodiments, cache assignment may comprise a schedule. For instance, FIG. 4 shows a flowchart 400 of a method for implementing a schedule in a cache assignment, according to an example embodiment. In an implementation, the method of flowchart 400 may be implemented by cache assignment determiner 314 and/or cache assignment 316. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, a start time at which the prefetch dataset should be obtained is identified. For instance, with reference to FIG. 3, cache assignment determiner 314 may identify a start time at which prefetch dataset 318 should be obtained by compute resource(s) 106. For example, cache assignment determiner 314 may identify a particular start time for a first prefetch dataset (or files contained therein), while identifying a different start time for a second prefetch dataset or files contained therein) based on when such datasets or files are expected to be read by compute resource(s) 106.

For example, if a particular job is expected to execute on compute cluster 102 at 2:00 pm with a certain input dataset, cache assignment determiner 314 may identify, in a prefetch schedule contained in cache assignment 316, that the input dataset should be obtained prior to 2:00 pm (e.g., at 1:30 pm, or any other appropriate time prior to the commencement of the job while taking into various constraints described herein). In some instances, cache assignment 316 may comprise a prefetch schedule that indicates a start time for a plurality of datasets for the same job or even different jobs executing on compute cluster 102 for a given planning window (e.g., during a 1-hour, 6-hour, etc. window). In such instances, prefetch coordinator 326 may be configured to obtain prefetch datasets according to cache assignment 316 and network bandwidth assignment 322 at the specified start times.

In this manner, network resources may be more efficiently utilized to balance the available bandwidth with a prefetch plan identifying when items should be obtained from remote data store 108. In other words, rather than obtaining a large volume of datasets from remote data store 108 at the same time, which may lead to a load on the network that exceeds the total network capacity, the prefetch schedule may optimize the timing in which prefetch datasets are obtained from remote data store 108 such that the network usage is spread out over a larger time period, thereby reducing the peak network bandwidth used and excessive network loads.

In step 404, a time at which the prefetch dataset should be evicted is identified. For instance, with reference to FIG. 3, cache assignment determiner 314 may be configured to identify, in the prefetch schedule, a time (e.g., an eviction time) at which compute resource(s) 106 should evict (e.g., delete, remote, overwrite, etc.) prefetch dataset 318 (or files contained therein) from cache 328. In such examples, since cache 328 is typically limited in size, items in cache 328 may be evicted in accordance with the prefetch schedule contained in cache assignment 316 to allow other prefetch datasets to be obtained and stored in cache 328 for different jobs (or different tasks in the same job).

For example, if one of future jobs 310 is expected to finish by a certain time, cache assignment determiner 314 may indicate, in the prefetch schedule, that prefetch dataset 318 corresponding to the job should be evicted from cache 328 after the excepted completion time. Accordingly, not only may cache assignment determiner 314 identify a start time at which datasets should be obtained from remote data store 108, cache assignment determiner 314 may also indicate in some implementations an expiry time identifying when such datasets should be evicted from the cache. Such a schedule enables cache 328 to be managed at a more granular level (e.g., by causing items to be stored in the cache only during times when such items are expected to be read), which may further improve performance of compute cluster 102.

Figure 5:
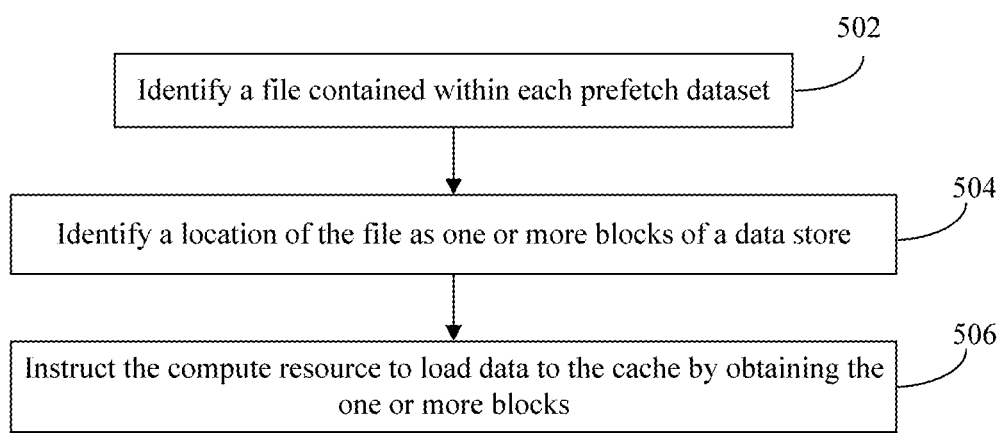
FIG. 5 shows a flowchart of a method for obtaining files of a data store by identifying file blocks, according to an example embodiment.

In some example embodiments, files may be cached based at least on one or more blocks that make up each file. For instance, FIG. 5 shows a flowchart 500 of a method for obtaining files of a data store by identifying file blocks, according to an example embodiment. In an implementation, the method of flowchart 500 may be implemented by plan instructor 324. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, a file contained within each prefetch dataset is identified. For instance, with reference to FIG. 3, file block determiner 323 may be configured to identify one or more files contained in one or more prefetch datasets 318. In some examples, prefetch dataset 318 may comprise one file, or may comprise a plurality of files (hundreds, thousands, or even more). In such examples, file block determiner 323 may be configured to identify (e.g., extract) each such file from prefetch dataset 318.

In step 504, a location of the file is identified as one or more blocks of a data store. For instance, with reference to FIG. 3, file block determiner 323 may identify 360 a location of a file of prefetch dataset 318 as one or more blocks of remote data store 108. In some examples, one or more blocks of the file may be spread across different storage devices (e.g., in a distributed storage system), such as where a file may exceed a predetermined size. In an illustrative example, a 1 gigabyte (GB) file may be split across a plurality of smaller blocks (e.g., blocks that do not exceed 128 megabytes), where reading of the 1 GB file requires reading each individual block in the appropriate sequence.

It is also noted that not all blocks that represent a particular file may be stored in the same storage device, or even in the same data store. For instance, a first set of blocks representing a file may be obtained from a first data store, while a second set of blocks representing the remainder of the file may be obtained from a second data store. Other techniques are also contemplated for storing blocks, such as using a distributed file system or other remote or cloud-based storage. Therefore, in implementations, file block determiner 323 may be configured to identify the location of the file in remote data store 108 based on the location of the separate blocks that represent the file.

In step 506, the compute resource of the cluster is instructed to load data to the cache by obtaining the one or more blocks for the prefetch dataset according to the cache assignment and the network bandwidth assignment. For instance, with reference to FIG. 3, plan instructor 324 may be configured to instruct prefetch coordinator 326 to load the one or more blocks representing the file in prefetch dataset 318 according to cache assignment 316 and network bandwidth assignment 322. In some implementations, for example, plan instructor 324 may instruct prefetch coordinator 326 to obtain blocks that make up a file from different data stores, at different times (e.g., based on a schedule as described herein, based on the sequence in which the blocks need to be read by compute resource(s) 106, etc.), and/or with different transfer rates. In other words, plan instructor 324 may be configured to instruct prefetch coordinator 326 to obtain different blocks that represent a file from remote data store 108, or even a plurality of different data stores, for placement in cache 328 in an optimal manner that may reduce overall network bandwidth issues, while also increasing the rate at which jobs may be executed on compute cluster 102.

Figure 6:
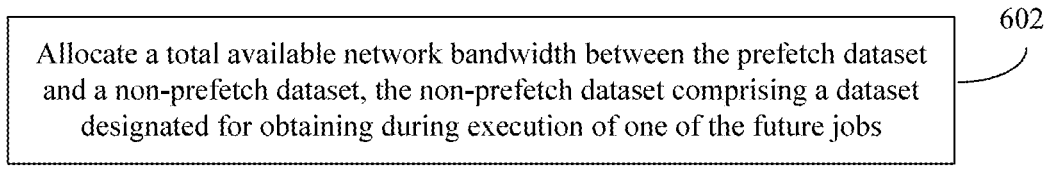
FIG. 6 shows a flowchart of a method for allocating a total network bandwidth, according to an example embodiment.

In some example embodiments, a total network bandwidth may be allocated during generation of a prefetch plan. For instance, FIG. 6 shows a flowchart 600 of a method for allocating a total network bandwidth, according to an example embodiment. In an implementation, the method of flowchart 600 may be implemented by network bandwidth allocator 320. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, a total available network bandwidth is allocated between the prefetch dataset and a non-prefetch dataset, the non-prefetch dataset comprising a dataset designated for obtaining during execution of one of the future jobs. For instance, with reference to FIG. 3, network bandwidth allocator 320 may configured to obtain total available bandwidth 332 (e.g., information that identifies the available network bandwidth between compute cluster 102 and remote data store 108, which may be constant or may change depending on times of day or other factors). Network bandwidth allocator 320 may allocate total available bandwidth 332 between prefetch dataset 318, and one or more additional datasets that are determined not to be prefetched (i.e., a non-prefetch dataset), such as a dataset that may comprise a relatively small volume of data. In other words, in some implementations, network bandwidth allocator 320 may allocate a subset of total available bandwidth 322 to prefetch bandwidth 318, thereby leaving the remaining bandwidth for compute cluster 102 to obtain files from remote data store 108 that were not prefetched (e.g., for the same job, a different expected future jobs and/or ad-hoc jobs that were not predicted to execute).

In some further implementations, plan instructor 324 may also be configured to instruct compute resource(s) 106 load data to cache 328 according to at least one of an updated cache assignment or an updated network bandwidth assignment. For instance, job planner 302 may determine that compute cluster 102 (or any of compute resource(s) 106) is not operating efficiently based one or more factors. Such factors may include an inaccurate prefetch plan that was provided to prefetch coordinator 326, the presence of one or more ad hoc jobs that have altered performance of compute cluster 102 that may warrant implementation of an updated prefetch plan, a network change (e.g., an unexpected increase or decrease in network bandwidth), one or more nodes of compute cluster 102 going down, or any other factors in which the performance of compute cluster 102 is altered in a manner that cache management system 104 may not have planned. Such an updated prefetch plan may indicate one or more new prefetch datasets to prefetch (or not prefetch), updated times at which datasets should be obtained from remote data store 108 and/or evicted from cache 328, updated rates of transfer allocated to datasets that are identified for prefetching, or any other characteristic that may dictate how prefetch coordinator 326 should manage cache 328.

In such instances, plan instructor 324 may be configured to interrupt prefetch coordinator 326 prior to expiry of a current prefetch plan, and provide an updated prefetch plan (e.g., according to an updated cache assignment and/or an updated network bandwidth assignment) for the remainder of the prefetch plan window to remedy the performance of compute cluster 102. In this manner, even in instances where compute cluster 102 may perform unexpectedly based on a number of factors, plan instructor 324 may monitor compute cluster 102 and provide an updated plan to improve performance.

III. Additional Example Query Optimizer Embodiments

A. Introduction

The following sections are intended to describe additional example embodiments in which implementations described herein may be provided. Furthermore, the sections that follow explain additional context for such example embodiments, details relating to the implementations, and evaluations of such implementations. The sections that follow are intended to illustrate various aspects and/or benefits that may be achieved based on techniques described herein, and are not intended to be limiting. Accordingly, while additional example embodiments are described, it is understood that the features and evaluation results described below are not required in all implementations.

In example query optimizer embodiments, techniques may be implemented by one or more of compute cluster 102, cache management system 104, compute resource(s) 106, remote data store 108, computing device 112, client application 114, job planner 302, workload analyzer 304, job characteristics 306, future workload predictor 308, future jobs 310, cache manager 312, cache assignment determiner 314, cache assignment 316, prefetch dataset 318, network bandwidth allocator 320, network bandwidth assignment 322, plan instructor 324, prefetch coordinator 328, cache 328, logs 330, total available cache size 331, or total available bandwidth 332 (including any subcomponents thereof). Other structural and operational implementations will be apparent to persons skilled in the relevant art(s) based on the following discussion.

Example implementations described herein enable the management of one or more caching tiers that are collocated with compute resources in the cloud. To this end, cache management system 104 uses as input information from previous job executions, the limits on the cache size and the limits on usable bandwidth on the compute-storage interconnect. Cache management system 104 generates a schedule that determines when and which datasets to prefetch into or evict from the cache, the bandwidth allocated for each prefetch and the bandwidth allocated for jobs to load data that is not prefetched or cached. In this manner, cache management system 104 may jointly optimize allocations of the various resources in order to meet end-to-end objectives such as increasing the number of jobs that meet deadlines. Example outcomes of this optimization include (i) to preferentially prefetch datasets that are used by multiple contemporaneous jobs, (ii) to preferentially cache smaller datasets, (iii) to preferentially cache datasets for jobs with tight deadlines, and (iv) to coordinate the cached fraction of datasets that are used in joins.

In example embodiments, a joint bandwidth and cache allocation problem may be solved by cache management system 104. Design choices may be made when formulating this problem to obtain a scalable solution, as described herein. In particular, a hierarchical optimization approach may be adopted in which a high-level planning is performed at the granularity of files, and a separate (lower-level) algorithm is used to assign resources (network bandwidth between storage and compute tiers, cache capacity) to blocks within each file. The higher-level optimization problem may a unified Linear-Programming (LP) formulation which allows operators to flexibly choose between different end-to-end objectives for different operational regimes: (i) increase the number of deadline service level objectives (SLOs) satisfied when all SLOs may not be met and otherwise (ii) reduce bandwidth used on the interconnect to the primary store. While (ii) may from the LP-formulation, (i) may be non-deterministic polynomial-time hard (NP-hard) and hard-to-approximate. Accordingly, efficient heuristics using LP-rounding techniques are developed. The lower-level algorithm may then translate the solution of the LP to an actual resource assignment, which can be implemented. Such decoupling may enable a reduction in the complexity of the underlying optimization problems.

In some example embodiments, cache management system 104 may be implemented on top of a data store used for data analytics, referred to as Apache Hadoop or Hadoop Distributed File System (HDFS). A capability to mount and cache data present in other remote filesystems was implemented in HDFS. The caching plan determined by cache management system 104 may be enforced by a separate component, where custom caching policies may be implemented. While implementations may be utilized for data-analytics clusters as described herein that may use HDFS on public clouds, techniques may be used in other scenarios as well, including disaggregated scenarios involving on-premise clusters.

Implementations were evaluated in various ways, including on a sample 50-node cluster and on a 280-node cluster that disaggregates compute and storage. Using workloads derived from production traces, cache management system 104 improved SLO attainment by up to 80% while using up to 5× less remote I/O bandwidth, compared to other caching schemes (e.g., workload-agnostic caching schemes). In examples, it was observed that the I/O cost per SLO attained was reduced by approximately 1.5×-7×. While cache management system 104 may offer enhanced benefits to jobs that are known in advance, ad hoc jobs may also benefit because (a) more resources are available to them due to the efficient execution of the predictable jobs and (b) reactive caching policies that may be implemented. In some evaluations, the median runtime of ad hoc jobs was observed to be reduced by up to 68%.

In many instances, public clouds do not typically allow independent control of the interconnect bandwidth. One commonly available solution to increase the interconnect bandwidth is to pay for a larger compute tier and/or storage tier in order to improve performance. However, with implementations described herein, performance improvements may be improved with existing setups, thereby enabling costs to be reduced. In other words, cache management system 104 may increase utilization of caching tiers on the compute tier and finish more jobs faster on fewer VMs.

The sections that follow will describe (i) a novel architecture that computes and enforces a cache schedule that is aware of limits on both store-compute I/O bandwidth and cache size, with an example implementation on top of Apache Hadoop/HDFS; (ii) A novel problem formulation which jointly optimizes I/O bandwidth and local storage capacity in disaggregated architectures to meet job SLOs, and practical algorithms to solve it; and (iii) an evaluation of implementations using sample deployments and workloads, demonstrating improvements in SLO attainment while reducing bandwidth used on the storage-compute interconnect.

B. Motivation

This section provides a brief overview of certain observations in connection with implementations of techniques described herein. An example is also provided describing the merits of jointly scheduling network and caching resources.

1. Storage in Public Clouds

Cloud storage offerings can be categorized into two types: (i) primary, remote storage such Microsoft® Azure Blob Storage, which can hold petabytes of data "at rest" in a globally addressable namespace, and (ii) local storage volumes which are typically only addressable by individual compute instances and can hold at most few tens of terabytes of data (e.g., Microsoft® Azure Premium Storage and local virtual machine (VM) storage.

The I/O throughput as well as the variability of both local and remote storage was measured for sample cloud providers that are remote stores, and SSD volumes which are attached to VMs as local storage. During measurements, 512 MB of data was repeatedly written and read from different types of VMs (compute-optimized, memory-optimized, storage-optimized). It was observed that local reads/writes have low variance (although the variance depends on the type of VM used), while reads/writes to primary remote stores had a much larger variance (5× to 30× larger). It was also observed that the throughput of the remote storage was 1.1× to 5× lower on remote stores compared to the local storage.

Thus, remote cloud storage has limited and variable I/O throughput. As a result, without significant over-provisioning, remote storage has difficulty meeting the needs of big data frameworks that require strict SLOs. Local storage, on the other hand, has higher throughput and lower variability. As a result, cache management system 104 may be configured to utilize local storage to build cache tiers and help jobs meet their deadline SLOs.

2. Analysis of Workloads

This section provides an analysis of the characteristics of typical big data workloads and provides additional insights. In observations, a sample production data analytics cluster was analyzed, along with several publicly available workloads. The cluster being analyzed consists of thousands of machines. In examples, logs were collected over one week which contained tens of thousands of jobs and hundreds of thousands of input files.

Job characteristics can be predictable. It was observed that a large fraction of workloads may be recurring and predictable. As a result, prefetching the inputs for these queries into the cache can increase the cache hit rate. Various characteristics of analytics jobs can be inferred from prior execution logs. For instance, nearly 40-75% jobs are recurring (i.e., the same code or script is run on different/changing input datasets), and that their submission times, deadlines, and input reuse times can be inferred with high accuracy.

Caching files saves network bandwidth. It was also observed that about 25% of files in example workloads were accessed by more than 10 jobs. These files contributed to more than 50% of the bytes accessed from the remote data store. Similar observations were made for other workloads. Caching such frequently accessed files may reduce the data read from remote storage.

File access recency or frequency is often insufficient to determine which files to cache. Different analytics workloads can process data at very different rates, e.g., reading a compressed file vs. un-compressed, JavaScript Object Notation (JSON) parsing vs. structured data. Jobs that are capable of processing data at higher rates or I/O bound jobs can be sped-up more by caching (or prefetching) their input files as they can take advantage of the higher I/O throughput local storage offers. However, standard caching policies (e.g., least recently used (LRU), least frequently used (LFU)) depend on file access recency and/or frequency, and do not take the data processing rates into account. Thus, such policies are often insufficient to determine which files to cache. Indeed, a low correlation (Pearson correlation coefficient=0.018) was observed between the number of jobs that read a file and the rate at which it is processed.

Data can be prefetched before job execution. The period between data creation and the earliest job execution using the data varies from a few minutes to several hours. If the data is prefetched to local storage before the dependent jobs start, these jobs will benefit from the higher throughput and lower variability of local storage.

To quantify such opportunities, a notion of "prefetch slackness" of a file was defined as the ratio between (a) the time elapsed since file creation to when it is first accessed, and (b) the time required to fetch the file from remote storage. While the former is a characteristic of the workload, the latter depends on bandwidth available to transfer the file. The prefetch slackness of files was measured in the examined workload using bandwidth values of 480 Mbps and 1 Gbps per VM, based on the measured average throughputs for the sample remote data stores. It was observed that 95% of the files have a prefetch slackness greater than one, i.e., they can be fully prefetched before being read by a job.

3. An Illustrative Example

In this section, it is illustrated how cache management system 104 may offer additional benefits over other techniques in an illustrative example. In the example, cache management system 104 offered improvements over existing techniques by, among other things, considering job characteristics and prefetching inputs into the cache.

In the illustrative example, a workload with six jobs is provided. In the workload of six jobs, $J_1, \ldots, J_6$, three files, $f_1, f_2, f_3$, are processed, as shown in Table 1 below:

TABLE 1

Illustrative Workload with 6 jobs and 3 files (all files are unit size)

| Jobs | Start | Deadline | Inputs, max. I/O rate |
|---|---|---|---|
| $J_1$ | 1 | 2 | $\{f_1, 2.0\}$ |
| $J_2$ | 1.5 | 3 | $\{f_2, 1.0\}$ |
| $J_3$ | 4 | 6 | $\{f_2, f_3, 1.0\}$ |
| $J_4$ | 4 | 6 | $\{f_2, 1.0\}$ |
| $J_5$ | 4.5 | 5 | $\{f_3, 2.0\}$ |
| $J_6$ | 5 | 6 | $\{f_1, 1.0\}$ |

The jobs may run on a compute cluster separated from the store containing the files. In the example, it is assumed that all files above have unit size, the cache tier has two units of capacity, the network between the store and compute has unit bandwidth, and the I/O bandwidth from the local cache is three units.

Figure 7A:
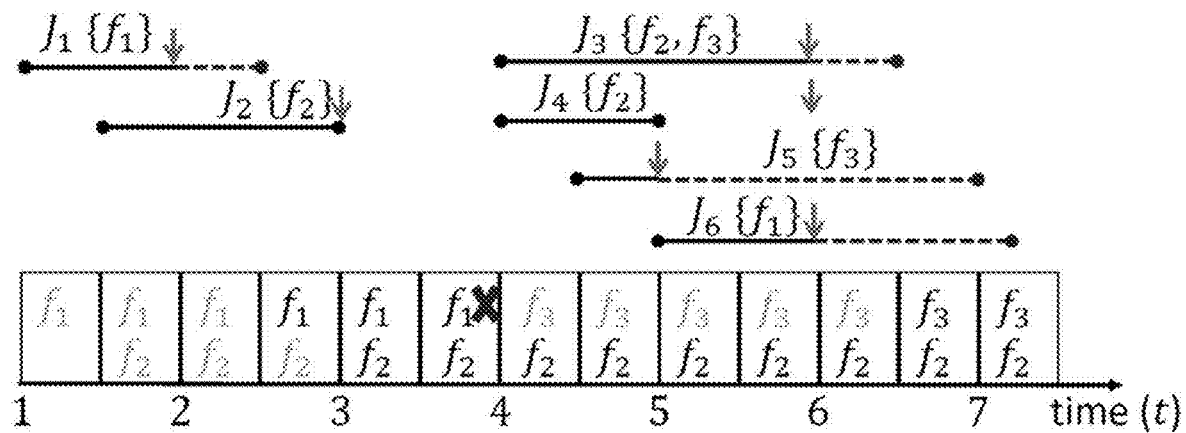
FIGS. 7A-7B show illustrations of example job executions based on cached data, according to embodiments.

FIG. 7A shows an illustrations of example job executions in a first technique. As shown in FIG. 7A, a time-lapse 700 of job execution when the cache is managed using techniques such as LRU is provided. In LRU, each cache-miss is added to cache by evicting, if necessary, the least recently used file. In this example, for simplicity, it is assumed that the interconnect bandwidth is divided equally across all jobs running at any point in time. Similar examples exist for other methods to share the I/O bandwidth. When $J_2$ starts at t=1.5, the I/O bandwidth to the store is shared equally between $J_1$ and $J_2$ causing $J_1$ to miss its deadline (identified by the arrow in following $J_1$ in FIG. 7A); note that $J_1$ reads half of $f_1$ in [1.0, 1.5] but the other half takes a full unit as it shares the I/O bandwidth. When $J_3$, $J_4$ start at t=4, $f_1$ is evicted to make room for $f_3$. $J_4$ benefits from a cache-hit and finishes in one unit time; reading from the cache is faster but this job is limited by its own maximum processing rate of the file $f_2$. $J_3$ also benefits from cache hit on $f_2$ and would have finished at t=6 because it takes two units of time to read $f_3$ from remote store. However, when $J_5$ and $J_6$ start, $J_3$'s bandwidth to the store drops to a half and a third respectively causing $J_3$ to miss its deadline. $J_5$ and $J_6$ both suffer from cache misses and receive small shares of the I/O bandwidth to the store causing them to also miss their deadlines. In summary, four out of six jobs miss their deadlines, the average job latency is 1.875 and 5 units are read from the remote store.

Figure 7B:
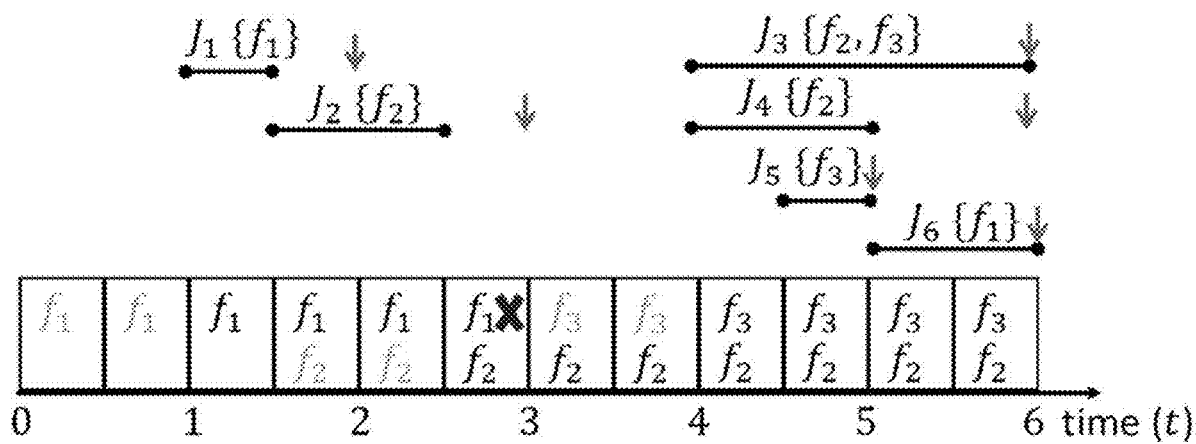

FIG. 7B illustrates example job executions in accordance with techniques described herein. In FIG. 7B, a time-lapse 702 to execute the same jobs using cache management system 104 is provided. Cache management system may determine to prefetch two files: $f_1$ because it is read at a high I/O rate by $J_1$ and $f_3$ because $J_5$ has a strict deadline. Even though $f_2$ is used by three different jobs, it is not prefetched as $J_2$ has a loose deadline. However, $f_2$ is cached after $J_2$ reads it from remote store (because $f_2$ is more useful than $f_1$ after t=3.5). Note that both $J_2$ and $J_6$ may finish faster even though neither benefits directly from the cache because more I/O bandwidth is available to them through intelligent allocation as described herein. Cache management system 104 may also ensure that both inputs are in the cache for $J_3$. In summary, all six jobs meet their deadlines, the average job latency is 1 and 4 units are read from the store. In this manner, improvements may be achieved on various metrics compared to other techniques, such as LRU. This example shows how cache management system 104 uses job characteristics to determine a cache and network-use schedule that lets more jobs meet their deadlines.

4. Takeaways

Based on observations, it was determined that: (i) job and input characteristics may be predictable before job submission, and can be used for network and storage resource planning; (ii) files can be prefetched ahead of job execution allowing jobs to benefit from the higher throughput and predictability of reading from local storage; (iii) I/O management for analytics in disaggregated environments should consider both the bandwidth to the remote store and the capacity of local storage.

C. Overview of Additional Example Implementations

Examples embodiments were implemented on deployments where (i) a compute cluster executes multiple analytics jobs over (ii) input data that is stored in a separate store, such as Azure Blob Storage and (iii) a distributed filesystem manages the storage available on the compute nodes (e.g., local VM disks, memory, SSDs).

The characteristics of recurring jobs may be used, among other things, by cache management system 104 to plan how I/O resources should be allocated so that more jobs finish within deadlines. In particular, cache management system 104 manages (i) the I/O bandwidth available to the primary cloud storage (also referred to as remote store), and (ii) the storage capacity of the secondary storage volumes (referred to as local store or the cache). A solution to this planning problem entails joint optimization across these two resources. This, in turn, indicates that decisions along multiple dimensions—for each (job, input file) pair may be made to determine if the file has to be cached, when and at what rate should the file be transferred from remote to local store, and when to evict it from the cache.

In example implementations, the optimization described may be modeled as a linear program, described in greater detail herein. This section provides additional examples regarding the architecture of implementations described herein, the design choices that result in a practically scalable optimization framework, and, various deployment details.

1. Example System Architecture

Figure 8:
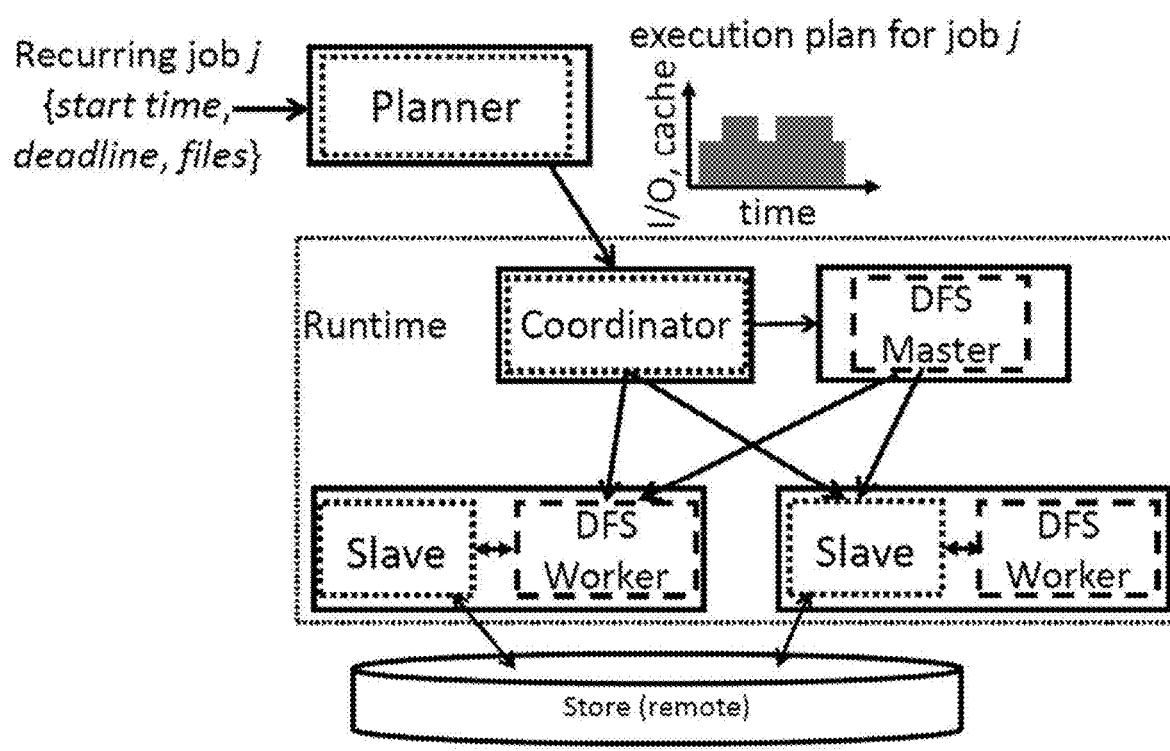
FIG. 8 shows a block diagram of an example system in which example embodiments may be implemented.

FIG. 8 shows a block diagram of an example system 800 in which example embodiments may be implemented. While this architecture is shown to work with distributed file systems (DFS) such as HDFS (and others), it is understood that the illustrated architecture is not intended to be limiting and that other implementations are also contemplated. As shown in the figure, the coordinator (illustrated as the "Coordinator") is conjoined with the file system master and the slaves (each illustrated as a "Slave") serve as an intermediary between the DFS workers and the remote store. Each of these components is described below.

Planner. Recurring job arrivals, their deadlines and inputs are obtained from analyzing logs of previous job executions. With this input, the planner (illustrated as the "Planner") may determine a cache and I/O resource assignment for jobs using the algorithms described herein. As distributed file systems, like HDFS, divide files into a sequence of blocks, this plan may specify how each input block is processed by a job during its execution—whether (i) the block is prefetched before job start and if so, when the block should be prefetched or (ii) the block is to be read from the remote store during job execution, in which case it may be specified whether the block should be cached. In either case, the plan may also specify the I/O rate to use to read/transfer the block and if the block is to be cached, it may specify which other block(s) to evict.

The planner may run at the start of every planning window (a configurable parameter, e.g., every hour) to plan for newly arriving jobs. It may also maintain the expected state of the cluster—what files (or portions thereof) are cached locally and how much bandwidth to the remote store is assigned to individual file transfers at future times. If the deadline of a job cannot be satisfied, the job can either execute as a best effort job or the user may submit it at a later time. The planner can also be invoked, on demand, to handle changes in the cluster or workload.

Runtime. The runtime, as shown in FIG. 8 as the "Runtime", comprises a cluster-wide coordinator and per-node slaves. The coordinator may coordinate I/O and cache activities. To prefetch a file, the coordinator may perform the appropriate metadata operations with the file system master to ensure that file blocks can be cached. For example, in HDFS, this involves setting the replication factor for the file so that the master need not delete the newly cached blocks. Next, the coordinator may issue fetch commands to individual workers (chosen at random in some examples) to fetch file blocks from the remote store. The workers may use the slaves to read data from the remote store at the specified rate. The coordinator may track the progress of prefetching and also handles evictions. Evicting a file may comprise metadata operations on the file system master and evict commands may be issued to the workers to delete cached blocks.

2. Illustrative Design Choices

In some instances, modeling each possible I/O action (prefetch a file, demand-paging, etc.) at the granularity of file blocks may be difficult from an optimization standpoint. In such instances, design choices may be made that allow for a scalable hierarchical optimization for the planning problem while also accounting for practical constraints imposed by big data filesystems. An overview of such design choices is provided below.

Decouple demand paging decisions from the central optimization framework. A job can read files in multiple ways: (a) from the remote store, either without caching the data (remote read) or after caching it locally (demand paging), or (b) from the cache, if the files are prefetched into the cache before it starts (prefetch read) or cached by an earlier job (cache hit).

The various read methods may interact in complex ways in examples. For instance, if two contemporaneous jobs access the same file, each can remote-read half of the file and benefit from a cache hit on the other half. However, an optimization problem that considers such complex interactions can often be intractable. To obtain a practically tractable solution, a trade-off between accuracy and performance was observed. For instance, in some solutions, demand paging can be ignored and only prefetch, cache-hits (due to prefetches) and remote reads may be taken into account. In other solutions, other factors, such as demand paging opportunities, or any other appropriate factor, may also be taken into account.

Plan at the granularity of files. Analytics frameworks often store files as a sequence of blocks, and jobs consist of tasks which read one or more blocks. Hence, planning at block granularity can useful. For example, even when a file may not be fully available in the cache many of its blocks may be in the cache. However, this can result in many variables and constraints making the optimization intractable at scale. Accordingly, in some implementations, the planer may optimize at the granularity of jobs and files, while the runtime may avail additional cache hit opportunities.

Translating a file-level plan to a block-level plan. One translation contemplated herein is to assign to each block $1n^{th}$ of the rate assigned to the file if the file has n blocks. In some implementations, however, time-varying I/O rates may be allocated to files which will translate into a time-varying rate for each block. Enforcing a time-varying rate may require coordination across the machines that work on each block. To circumvent such complexity, a fixed but different rate for each block in the file may be enforced, where such rates are computed by fitting as many rectangles as the number of blocks into the "skyline" of file's allocation (height at time t is the rate assigned to the file at time t).

3. Deployment Considerations

Replica placement on local storage, and task placement. Cache management system 104 is configured to consider what to cache and how to transfer data from remote stores to the cache. In some implementations, replica placement is not modeled (i.e., which machines contain each block). Implementations described herein may instead utilize a default replica placement policy in some instances (e.g., a default policy in RDFS for replica placement) and uses a locality-aware scheduler for task placement. In other instances, other replica placement policies may also be implemented, which can lead to improved performance.

Ad hoc jobs. While a large fraction of the workload in production clusters may be recurring and known (or predicted) in advance, big data clusters also run ad hoc jobs. Such ad hoc jobs can compete with SLO jobs for compute, cache and network resources. To protect the SLO jobs from such interference by ad hoc jobs, ad hoc jobs may be executed at lower priority or using any other priority scheduling technique. In some implementations, cache management system 104 may prevent ad-hoc jobs from evicting data that is cached for SLO jobs.

Prediction errors. As described, implementations may enable prediction of submission times of jobs and the time their input files are available using techniques described herein. When the actual runtime behavior of a job diverges from the generated plan (e.g., diverges significantly), such as where a file is not available for prefetch when expected, the job may be executed using other techniques. For instance, the job's input may be cached on-demand. In other examples, the generated plan may be dynamically adapted to meet job SLOs based on runtime deviations.

Exogenous concerns. In some implementations, problems of capacity planning or auto-scaling resource reservations with cluster load may not be considered, although implementations are not limiting. Furthermore, implementations may also be configured to consider only I/O reads but not writes. For instance, writes can be accommodated by setting aside a portion of the I/O bandwidth and using techniques appreciated to those skilled in the relevant arts or by specifying some time-varying write rate in the planner.

D. Algorithm Design

This section describes a formulation of the algorithmic setting for generating a prefetch plan. This section also discusses the development of a unified LP optimization framework that enables planning for the I/O resource allocation to meet end-to-end job level goals. Finally, this section describes the lower-level mechanisms that translate the solution of the LP into an efficient and practical execution plan.

1. Preliminaries

In examples, an offline planning problem may be formulated, in which the algorithm has information about all jobs submitted and all files required within a planning window T. The input to the problem consists of a set of N jobs $j=1, \ldots, N$ and L files $l=1, \ldots, L$. All files may be stored in the remote store (to start off) and the jobs are run in a separate compute cluster. Each job j has a submission time $a_j$ and deadline $d_j$. Each file l has size $s_l$, and may be required by a subset of jobs $J_l$. The subset of files required by job j may be denoted by $F_j$. The local store (e.g., the cache local to the compute cluster) may have a fixed capacity C. The maximum bandwidth available to transfer data from the remote storage to the local store is B—this limit can be enforced by the remote storage itself or can be because of the limits on the (virtual) network cards of the compute instances.

Two illustrative ways in which files can be read are described below.

Prefetch read. If file l (or parts of it) is prefetched and cached in the local store, then all jobs in $J_l$ that start after the prefetch can access it. It is assumed in implementations that prefetching can be done with no rate restrictions, i.e., a file can be prefetched using any amount of available network bandwidth (the total bandwidth used should be less than B). Further, to improve benefits from prefetching, it is also assumed that all file data for a given file is cached before the start of a job. It is also assumed that a cached file l cannot be evicted during a time window $(a_j, d_j)$ if there is a job j that requires l. It is noted that these are not intended to be limiting (e.g., other implementations may be configured to evict parts of a file already processed to free up cache space).

Remote read. If the file (or parts of it) is read from the remote store, each job j has to read the file separately. Due to practical restrictions it is assumed that remote reads take place at a fixed rate $r_{j,l}$, that may be determined in various ways.

Objectives. Two additional variants of the problem may also be considered corresponding to different load regimes. The first is a light/medium load regime, where there is may be enough network bandwidth to accommodate all job deadlines. The objective in such a regime is to minimize peak bandwidth utilization while meeting all job deadlines. This objective also enables freeing up the network for unplanned/ad hoc jobs. The second is a high load regime, where production jobs may not finish by their deadline. Hence, the objective in example implementations is to increase the number of jobs that meet their deadlines given a fixed network bandwidth.

2. Linear Programming Formulation

In this section, a unified linear programming formulation is described that is used for the two objective functions described above. The following variables are used in the formulation:

$r_{j,l}$: the rate at which file l is read by job j from remote (as remote read).

$C_{l,t}$: number of bytes of file l in cache at time t $X_{l,t}$: number of bytes of file l prefetched to cache at time t B: available network bandwidth.

The LP may take into account one or more of the following constraints: (1) $r_{j,l}(d_j-a_j)+C_{l,a_j} \geq s_l, \forall j,l$ (data may be read, either from cache or remotely); (2) $C_{l,t} \leq C_{l,t-1} + X_{l,t}$, $\forall t,l$ (caching may prefetching); (3) $C_{l,t+1} \geq C_{l,t}$, $\forall t \in [a_j, d_j]$, $\forall l \in F_j, j$ (cache evictions may be prevented while job j is running); (4) $\Sigma_l C_{l,t} \leq C$, $\forall t$ (cache capacity may not be exceeded); and (5) $\Sigma_{j|t \in [a_j,d_j]} \Sigma_l (r_{j,l}+X_{l,t}) \leq B, \forall t$ (bandwidth used may not exceed the capacity B).

A solution to the above linear program provides a prefetching plan of files to the cache. In some examples, the above LP allows a part of a file to be prefetched to the cache and the rest to be read from the remote store. By the above assumptions, a (part of) file l read from the remote store defines a rectangle whose base is the window $[a_j, d_j]$ and its height is the rate $r_{j,l}$ at which the file is read.

Bandwidth minimization. Under this scenario, the network bandwidth B is a variable, and the objective is to reduce B under the above constraints. A solution to this LP can be used as an execution plan, as the files of every job are fully read, either from the cache or the remote store.

Increasing number of jobs satisfied. In high load scenarios, one objective is to increase the number of jobs that are fully satisfied, when the network bandwidth B is fixed. This problem can be shown to be NP-hard by reducing the densest-k-subgraph problem. The densest-k-subgraph problem is NP-hard and its approximability has remained wide open despite many efforts.

A mixed integer linear program (MILP) may be formulated to increase the number of jobs satisfied. First, constraints 2-5 described above may also apply here. For each job j, a new binary variable $p_j$ is introduced such that $p_j=1$ if job j is fully satisfied (i.e., its input files are read completely). This may be captured through the constraint below, for every j, l:

$$p_j \frac{r_{j,l}(d_j - a_j) + C_{l,a_j}}{s_l}$$

The objective then may be to increase $\Sigma_j p$. In evaluations, it was determined that this MILP was not scalable for problem instances of around thousand jobs (or more). Consequently, a solution was used which is based on the following relaxation of the problem: $p_j$ as a continuous variable between zero and one, i.e., $p_j$ now stands for the fraction of job j executed. This results in a LP with the same objective and constraints as the above MILP.

However, the fractional solution obtained from this LP for maximizing number of jobs may not directly yield an execution plan as job j will not process its files fully when $0 < p_j < 1$. Thus, a goal may be to translate this fractional solution into a solution of the MILP above (jobs either execute fully or not at all). For this purpose, the following rounding procedure may be used:

Randomized rounding procedure. The execution plan may be divided between prefetching files to the cache and reading files from the remote store. A prefetch plan may be followed for files as given by the fractional solution. The remaining parts of the files may not be fully transferred from the remote store. Hence, a procedure for choosing which content should be transferred from the remote store may be utilized. To that end, a procedure called randomized rounding is used to the remote reading of files. Such an idea attains to pick files with probability which is proportional to their value in the fractional LP, while ensuring that the channel capacity is not violated (with high probability).

Consider a job j; in the fractional solution each file l read by j corresponds to a rectangle whose basis is [$a_j$, $d_j$] and height is $r_{j,l}$. All such rectangles can be aggregated into a single rectangle of height $h_j = \Sigma_l r_{j,l}$. Further, p'j may refer to the fraction of the contents of files read by job j from the remote store, ignoring the cache contribution, and may be defined as follows:

$$p'j = \frac{h_j(d_j - a_j)}{\sum_{l \in j}(s_l - C_{l,a_j})}$$

A randomized rounding may then be applied to the remote reading of files. Independently, for each job j, a rectangle of height $(\Sigma_{l \in j}(s_l - C_{l,a_j}))/(d_j - a_j)$ with a probability of p'j may be allocated. It follows from that the probability of deviating from the network capacity is small, as a result of this randomized rounding procedure. This can be evaluated under the assumption that for each job j, $\Sigma_{l \in j}(s_l - C_{l,a_j})$ is not too large relative to B.

3. Determining an Execution Plan

The pseudo-code below describes a simple mechanism, which supplements the LP solution described herein. The mechanism reclaims some of the lost opportunities due to design choices described above, and outputs a practical execution plan. The pseudo-code is shown below:
function TRANSLATE(start time s, end time T, rates X[ ], blocks b[ ])
   i←min{t|t≥s, $X_{l,t}$>0 $\lor$ T} [Start of interval]
   if i=T then
     return ø[No capacity in interval]
   j←min{t|t>i, $X_{l,t}$=0} [End of interval]
   r←min{$X_{l,k}$|∀i≤k<j} [Least common rate to interval]
   a←{($b_x$, r)|x=1, . . . , ⌈r (j−i)/blocksize⌉} [Assign x blocks at rate r]
   b'←{$b_x$|$b_x$∈b, $b_x$∉a} [Remaining blocks]
   X'←[$X_i$−r|i=1, . . . , |X|] [Remaining bandwidth]
   a←a∪TRANSLATE (i, j, X', b') [Recursively assign remaining]
   b'←{$b_x$|$b_x$∈b, $b_x$∉a} [Remaining blocks]
   X'←[$X_i$−r|i=1, . . . , |X|] [Remaining bandwidth]
   return a∪TRANSLATE (j, T, X, b') [Assign capacity after this interval]

Cache augmentation. The optimization framework discussed herein may forego opportunities for demand paging, preferring a simple and scalable formulation in some implementations. However, caching data read directly from the remote store can further reduce the remote I/O. To exploit such opportunities, the cache space that is not consumed by prefetched data may be leveraged. Thus, the usable cache space is given by $\overline{C}_t = C - \Sigma_l C_{l,t}$ at any time t. A pluggable caching policy is used to manage this space and cache the data read remotely by each job j, when possible. Caching policies as appreciated to those skilled in the art may be implemented, and is not limited to any particular example.

Translate file-level plan to block-level plan. The solution of the LP determines a file-level plan. However, as discussed earlier, most distributed file systems store files as a sequence of blocks. Thus, a file-level plans needs to be translated into a block-level plan to be practical. This involves translating the following components:

(a) Cache state. Suppose the block size of file l is $b_l$ bytes. $C_{l,t}$ gives the size of file l in the cache at time t. This translates to the first $\lfloor C_{l,t}/b_l \rfloor$ blocks of file l being cached at time t. If this value decreases at any time t compared to t−1, the corresponding number of blocks should be evicted from the cache. If it increases, then blocks of file l will be added to the cache using the network transfers described next.

(b) Prefetch network transfers. A solution of the LP formulation assigns a time-varying rate, $X_{l,t}$, to the file l at time t. Thus, its transfer is described by the time series given by {$X_{l,t}$|t∈[0,T])} where $X_{l,T}$=0. Suppose file l is fetched into the cache only once. The pseudo-code may be used to translate its time series into a collection of rectangles, where each rectangle corresponds to the transfer of a single block at a constant rate. If file l is fetched multiple times, the pseudo-code may be repeated for each time it is fetched.

E. Implementation of Additional Example Embodiments

Implementations described herein may be evaluated using Apache Hadoop/HDFS or any other suitable data analytics platform. In implementations, access data in the remote store may be performed seamlessly, (b) data may be prefetched into the local storage for future jobs at a specified rate, and (c) data may be cached in local storage as needed. The sections below first provide provides a brief overview of RDFS in which example embodiments may be implemented, followed by a description of the example implementation.

HDFS overview. HDFS exports a hierarchical namespace through a central NameNode. Files are managed as a sequence of blocks. Each block can have multiple replicas stored on a cluster of DataNode servers. Each DataNode is configured with a set of attached storage devices, each associated with a storage type. The storage type is used to identify the type of the storage device—existing types are DISK, SSD, or RAMdisk. When a DataNode starts up, it reports the list of replicas stored on each of its storage devices (and hence, storage type). From these reports, the NameNode constructs a mapping between the blocks and the storage devices on all the DataNodes that contain a replica for the block.

For each file in the namespace, the NameNode also records a replication factor specifying the target number of replicas for each block in the file, and a storage policy that defines the type of storage in which each replica should be stored. If the number of available replicas for a block are below its expected replication factor, the NameNode schedules the necessary replications.

Modifications to HDFS. Implementing example embodiments in HDFS was performed via extensions. The following description describes the engineering details related to such conceptual implementation changes.

PROVIDED storage. A new storage type called PROVIDED was added to HDFS to identify data external to HDFS and stored in remote stores. Both the NameNodes and DataNodes are modified to understand the PROVIDED storage type. To address data in the remote store, the remote namespace (or portion thereof) is first mounted as a subtree in the NameNode. This may be performed through a metadata operation, and may be done by mirroring remote files in the HDFS namespace and configuring a replica of PROVIDED storage type for each block in the namespace.

Subsequently, when any DataNode configured with PROVIDED storage reports to the NameNode, it considers all PROVIDED replicas reachable from that DataNode. Any request to read data from the remote store has to pass through a DataNode with PROVIDED storage type. As data is streamed back to the client, the DataNode can cache a copy of it in the local storage.

Metered block transfers. A throttling parameter was added to block transfer requests, allowing us to control the rate at which block data is sent. The throttling is implemented using token buckets. With this, client read requests and block replications can be limited to a target rate. When blocks of a file are replicated together, concurrent transfers do not exceed the target rate.

Planner and coordinator realization. The planner and coordinator described herein may be implemented as standalone components (run on the same machine as the HDFS NameNode in experiments). PROVIDED storage devices configured in DataNodes serve as the one or more slave devices, as described above.

Using the above modifications to HDFS, the coordinator can prefetch remote files (into local storage) by adjusting their storage policy and scheduling block replications at the rate determined by the execution plan. The slaves ensure that when jobs read data from the remote store, it is transferred at the rate specified by the execution plan. For cache evictions, the coordinator evicts replicas from local storage by lowering the replication of a file. For example, lowering replication to 1 causes HDFS to delete all replicas but the PROVIDED replica.

F. Evaluation

Example embodiments were evaluated on a 50 node cluster, a 280 node bare metal cluster, and using large-scale simulations. Experiments were based on workload traces from a production analytics cluster, running on thousands of machines. Compared to various baselines representing state-of-the-art in cloud data analytics, example embodiments had numerous benefits. First, reduced peak utilization and total data transferred from the remote store to the compute cluster by up to 5× was observed. This, in turn, reduces I/O cost per SLO attained by 1.5×-7×. Second, the number of jobs that met their deadlines increased up to 80%, under high-load. Third, the I/O resources were efficiently allocated for the SLO jobs which allows ad hoc jobs to run 20%-68% faster.

1. Methodology

Experimental setup. Example embodiments were deployed in two different environments for evaluation, described below.

50-node VM cluster: HDFS was executed with example embodiments implemented therein on a cluster of 50 VMs, using a suitable resource management framework. HDFS DataNodes were configured with the SSD-based local disk (which acts as cache), and the Azure Blob Storage as PROVIDED storage. Input files were stored on Azure Blob Storage.

280-node bare metal cluster: Example embodiments were also evaluated at larger scale using this cluster. The cluster consists of 7 racks with 40 machines each. Each machine has an Intel® Xeon E5 processor, 10 Gbps NIC, 128 GB RAM and 10 HDDs. Six of the racks are used for compute and one is used for storage. Bandwidth between the two is limited to 60 Gbps to emulate a cloud environment. The storage tier runs stock HDFS and stores the input data for the workloads. The compute tier runs HDFS with the modifications described.

Workloads. Sample workloads are based on a day-long trace in an example setting. Workloads from 4 different business units (B1, B2, B3 and B4) of an organization were considered, and scale them down to fit the cluster setup. Job SLOs are derived using techniques as will be appreciated to those skilled in the relevant arts. Based on these workloads, a job trace lasting one hour was generated.

Metrics. The following metrics were used to measure the benefits of example embodiments under medium to high load scenarios: (i) peak network bandwidth (averaged over 2 seconds), (ii) total data transferred from remote store and (iii) number of SLO jobs that are admitted, and meet their deadlines. It is noted that the total data transferred from the remote storage is directly proportional to the cost of I/O (in dollars) to cloud users. Thus, any reduction in this metric reduces the I/O cost for a workload. The scalability of the planning algorithm, and its solution quality was also evaluated by comparing against a MILP.

Baselines. Example embodiments were evaluated against numerous baselines that may represent how typical data analytics workloads may run in public clouds, as will be appreciated to those skilled in the arts.

2. Additional Benefits

Deployment. Example embodiments were evaluated under two different load regimes.

Medium load regime. When the job arrival rate is low, it is expected that jobs to meet their deadline SLOs. In particular, in evaluations, it was ensured that the available I/O bandwidth to Azure Blob Storage was sufficient to meet all job deadlines even when each job reads directly from it. However, in practice, due to variance in the I/O bandwidth to the blob store, jobs using other techniques can miss their deadlines. With implementation of example embodiments described herein, a reduction in the number of missed deadlines was observed over the various sample workloads. Furthermore, a 44-77% reduction in peak I/O bandwidth and 63-81% reduction in data transferred was observed compared to other techniques (i.e., up to a 5× reduction), which may be a result of job and file-access characteristics to appropriately plan data prefetch and cache occupancy. For instance, implementations described herein enable prioritizing the prefetching of files accessed by a larger number of jobs, and fetching them at a sufficient rate. As cloud providers charge users for data transferred from the storage to the compute tiers example embodiments also helped reduce the I/O cost per job SLO met High load regime. Under high load when it may not be possible to meet deadlines of all SLO jobs, example embodiments aim to increase the number of jobs that meet their deadlines. The planning algorithm was compared with planning algorithms that use other techniques to run jobs. It was observed that the number of jobs admitted with example embodiments increased compared to other strategies in (a) an offline scenario, where it is assumed that all jobs are known ahead of time, and (b) an online scenario, where jobs are planned for as they are submitted. Jobs may be derived from workload B1, job inter-arrival duration is decreased by a random factor between 2-5×, and planning algorithms are run with different bandwidth limits between the storage and compute. It was also observed that example embodiments enabled acceptance of up to 80% more jobs than some other techniques, which may be the result of (a) the reduction in the peak network bandwidth with prefetching, allowing more jobs to be admitted, and (b) efficient use of the cache and network resources by planning ahead of job submissions.

Deployment on 280-node bare-metal cluster. The results observed in this implementation were qualitatively similar to those observed in the previously described experiments.

3. Performance of Planning Algorithms

Scalability of LP formulation. In some embodiments, the scalability of the LP described herein may depend on the number of jobs to plan for, number of files accessed by each job, and the duration of the plan.

Comparison to a MILP-based lower bound. For improved scalability, a fractional linear program may be solved which may allow approximating the MILP to increase the number of jobs admitted.

Sensitivity analysis. In some implementations, predictable job characteristics may be utilized to determine an efficient execution plan. However, techniques to predict workload characteristics may still have some prediction errors. To further evaluate the robustness of example embodiments, errors were introduced in the following job characteristics for workload B1: (a) job submission times—A certain percentage of jobs are chosen at random, and their submission times are changed by a randomly chosen value between −5 and 5 minutes (this is more than twice the average job inter-arrival duration), and (b) file sizes—the sizes of a certain percentage of files, chosen at random, are increased or decreased by up to 10%; this represents nearly 3× the typically prediction error. Even as the percentage of error increases, example embodiments were observed to perform better than other techniques using the various baselines.

4. Benefits for Ad Hoc Jobs

Data analytics clusters run ad hoc jobs along with SLO jobs for data exploration or research purposes. No guarantees are provided to the ad hoc jobs, but users expect them to finish quickly. While example embodiments may not schedule the ad hoc jobs, its efficient use of resources for SLO jobs allows ad hoc jobs to run faster.

To understand this effect, trace-driven simulations were performed with ad hoc jobs running alongside SLO jobs. The SLO jobs are derived from workloads B1 and B2. Ad hoc jobs are derived from two sets of traces, labeled as workloads A1 and A2, respectively. For the first set of traces, 40% of the jobs were sampled to be ad hoc jobs (which has been shown to be typical percentage of ad hoc jobs in clusters). In these simulations, resources are reserved for the SLO jobs to avoid interference from ad hoc jobs, and ad hoc jobs share the remaining resources based on max-min fairness. In such examples, improvement in the runtime percentiles of ad hoc jobs was observed. As example embodiments aim to reduce the network utilization of SLO jobs, they free up the network resources for ad hoc jobs and significantly improves their runtimes—up to 68% improvement in the $50^{th}$ percentile.

G. Concluding Remarks

Implementations described herein enable one or more caching tiers to be maintained in a manner that provides predictable data access for analytics jobs over disaggregated stores. Further, any one or more of the techniques described herein may be used together and/or separately. When workload is predictable, the cache may be prefilled to improve performance. When job characteristics such as deadlines and I/O rates are available, cache management system 104 may tune what is cached and how it allocates the I/O rate so as to let more jobs meet their deadlines. Doing so preferentially caches files used by jobs with tighter deadlines and files processed by jobs that read with high I/O rate. In this manner, the overall problem, jointly allocating network and cache resources in order to meet job SLOs and/or reducing the network bandwidth used, may be addressed.

IV. Example Mobile and Stationary Device Embodiments

Compute cluster 102, cache management system 104, compute resource(s) 106, remote data store 108, computing device 112, client application 114, job planner 302, workload analyzer 304, job characteristics 306, future workload predictor 308, future jobs 310, cache manager 312, cache assignment determiner 314, cache assignment 316, prefetch dataset 318, network bandwidth allocator 320, network bandwidth assignment 322, plan instructor 324, prefetch coordinator 328, cache 328, logs 330, total available cache size 331, total available bandwidth 332, any one or more of the components or subcomponents shown in FIGS. 7A, 7B, and 8, flowchart 200, flowchart 400, flowchart 500, and/or flowchart 600 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of compute cluster 102, cache management system 104, compute resource(s) 106, remote data store 108, computing device 112, client application 114, job planner 302, workload analyzer 304, job characteristics 306, future workload predictor 308, future jobs 310, cache manager 312, cache assignment determiner 314, cache assignment 316, prefetch dataset 318, network bandwidth allocator 320, network bandwidth assignment 322, plan instructor 324, prefetch coordinator 328, cache 328, logs 330, total available cache size 331, total available bandwidth 332, any one or more of the components or subcomponents shown in FIGS. 7A, 7B, and 8, flowchart 200, flowchart 400, flowchart 500, and/or flowchart 600 may be implemented separately or together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
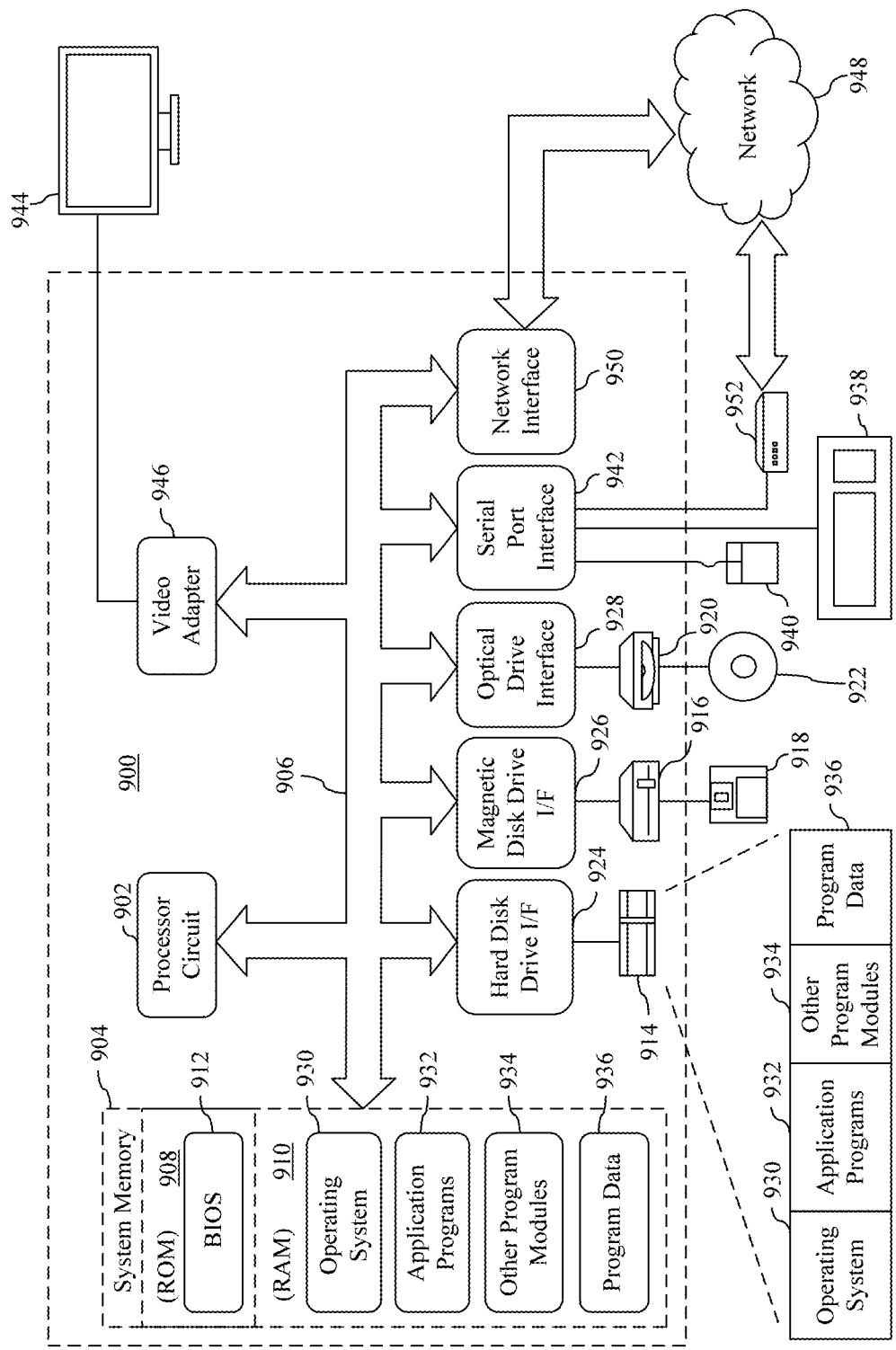
FIG. 9 shows an example computing device that may be used to implement example embodiments.

FIG. 9 depicts an example implementation of a computing device 900 in which example embodiments may be implemented. For example, any of compute cluster 102, cache management system 104, compute resource(s) 106, remote data store 108, computing device 112, client application 114, job planner 302, workload analyzer 304, job characteristics 306, future workload predictor 308, future jobs 310, cache manager 312, cache assignment determiner 314, cache assignment 316, prefetch dataset 318, network bandwidth allocator 320, network bandwidth assignment 322, plan instructor 324, prefetch coordinator 328, cache 328, logs 330, total available cache size 331, total available bandwidth 332, and/or any one or more of the components or subcomponents shown in FIGS. 7A, 7B, and 8 may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Example embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing compute cluster 102, cache management system 104, compute resource(s) 106, remote data store 108, computing device 112, client application 114, job planner 302, workload analyzer 304, job characteristics 306, future workload predictor 308, future jobs 310, cache manager 312, cache assignment determiner 314, cache assignment 316, prefetch dataset 318, network bandwidth allocator 320, network bandwidth assignment 322, plan instructor 324, prefetch coordinator 328, cache 328, logs 330, total available cache size 331, total available bandwidth 332, any one or more of the components or subcomponents shown in FIGS. 7A, 7B, and 8, flowchart 200, flowchart 400, flowchart 500, and/or flowchart 600 (including any suitable step of flowcharts 200, 400, 500, or 600) and/or further example embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of example embodiments described herein. Accordingly, such computer programs represent controllers of the computing device 900.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Example Embodiments

A system for prefetching data is described herein. The system includes: one or more processors; and one or more memory devices that store program code configured to be executed by the one or more processors, the program code comprising: a workload analyzer configured to identify job characteristics for each of a plurality of previously executed jobs in a workload executing on a cluster of one or more compute resources, the job characteristics including, for each job, at least an identification of an input dataset and an input dataset bandwidth characteristic for the input dataset; a future workload predictor configured to identify a plurality of future jobs expected to execute on the cluster based on the identified job characteristics; a cache assignment determiner configured to determine a cache assignment that identifies a prefetch dataset for at least one of the future jobs; a network bandwidth allocator configured to determine a network bandwidth assignment for the prefetch dataset; and a plan instructor configured to instruct a compute resource of the cluster to load data to a cache local to the cluster according to the cache assignment and the network bandwidth assignment.

In one implementation of the foregoing system, the future workload predictor is configured to identify the plurality of future jobs expected to execute on the cluster for a planning window.

In another implementation of the foregoing system, the cache assignment comprises a prefetch schedule, the prefetch schedule identifying a start time at which the prefetch dataset set should be obtained.

In another implementation of the foregoing system, the prefetch schedule further identifies a time at which the prefetch dataset should be evicted from the cache local to the cluster.

In another implementation of the foregoing system, the input datasets and prefetch dataset are stored on one or more data stores located remotely from the cluster.

In another implementation of the foregoing system, the workload analyzer is configured to identify the job characteristics for each of the plurality of previously executed jobs offline from a workload production.

In another implementation of the foregoing system, the cache manager further comprises: a file block determiner configured to: identify a file contained within each prefetch dataset, and identify a location of the file as one or more blocks of a data store; and the plan instructor is configured to instruct the compute resource to load data to the cache by obtaining the one or more blocks for the prefetch dataset according to the cache assignment and the network bandwidth assignment.

In another implementation of the foregoing system, the network bandwidth allocator is further configured to allocate a total available network bandwidth between the prefetch dataset and a non-prefetch dataset, the non-prefetch dataset comprising a dataset designated for obtaining during execution of one of the future jobs.

A method for prefetching data is described herein. The method includes: identifying job characteristics for each of a plurality of previously executed jobs in a workload executing on a cluster of one or more compute resources, the job characteristics including, for each job, at least an identification of an input dataset and an input dataset bandwidth characteristic for the input dataset; identifying a plurality of future jobs expected to execute on the cluster based on the identified job characteristics; determining a cache assignment that identifies a prefetch dataset for at least one of the future jobs; determining a network bandwidth assignment for the prefetch dataset; and instructing a compute resource of the cluster to load data to a cache local to the cluster according to the cache assignment and the network bandwidth assignment.

In one implementation of the foregoing method, the identifying the plurality of future jobs comprises identifying the plurality of future jobs expected to execute on the cluster for a planning window.

In another implementation of the foregoing method, the cache assignment comprises a prefetch schedule, the prefetch schedule identifying a start time at which the prefetch dataset set should be obtained.

In another implementation of the foregoing method, the prefetch schedule further identifies a time at which the prefetch dataset should be evicted from the cache local to the cluster.

In another implementation of the foregoing method, the input datasets and prefetch dataset are stored on one or more data stores located remotely from the cluster.

In another implementation of the foregoing method, the identifying the job characteristics comprises identifying the job characteristics for each of the plurality of previously executed jobs offline from a workload production.

In another implementation of the foregoing method, determining the network bandwidth assignment comprises allocating a total available network bandwidth between the prefetch dataset and a non-prefetch dataset, the non-prefetch dataset comprising a dataset designated for obtaining during execution of one of the future jobs.

In another implementation of the foregoing method, the method further includes: instructing the cluster to load at data to the cache according to at least one of an updated cache assignment or an updated network bandwidth assignment.

A computer-readable memory is described herein. The computer-readable memory has computer program code recorded thereon that when executed by at least one processor causes the at least one processor to perform a method comprising: identifying job characteristics for each of a plurality of previously executed jobs in a workload executing on a cluster of one or more compute resources, the job characteristics including, for each job, at least an identification of an input dataset and an input dataset bandwidth characteristic for the input dataset; identifying a plurality of future jobs expected to execute on the cluster based on the identified job characteristics; determining a cache assignment that identifies a prefetch dataset for at least one of the future jobs; determining a network bandwidth assignment for the prefetch dataset; and instructing a compute resource of the cluster to load data to a cache local to the cluster according to the cache assignment and the network bandwidth assignment.

In one implementation of the foregoing computer-readable memory, the cache assignment comprises a prefetch schedule, the prefetch schedule identifying a start time at which the prefetch dataset set should be obtained.

In another implementation of the foregoing computer-readable memory, the prefetch schedule further identifies a time at which the prefetch dataset should be evicted from the cache local to the cluster.

In another implementation of the foregoing computer-readable memory, the determining the network bandwidth assignment comprises allocating a total available network bandwidth between the prefetch dataset and a non-prefetch dataset, the non-prefetch dataset comprising a dataset designated for obtaining during execution of one of the future jobs.

VI. Conclusion

While various embodiments of the disclosure have been described above, it should be understood that they have been presented by way of example only, and not limitation. It will be understood by those skilled in the relevant art(s) that various changes in form and details may be made therein without departing from the spirit and scope of the disclosure as defined in the appended claims. Accordingly, the breadth and scope of the disclosure should not be limited by any of the above-described example embodiments, but should be defined only in accordance with the following claims and their equivalents.

What is claimed is:

1. A system for prefetching data, comprising:
   one or more processors; and
   one or more memory devices that store program code configured to be executed by the one or more processors, the program code comprising:
   a workload analyzer configured to identify a plurality of previously executed jobs in a workload executing on one or more compute resources;
   a future workload predictor configured to identify a plurality of future jobs expected to execute on the one or more compute resources based at least on the previously executed jobs;
   a cache assignment determiner configured to determine a cache assignment that identifies a prefetch dataset for at least one of the future jobs;
   a network bandwidth allocator configured to determine a network bandwidth assignment for the prefetch dataset; and
   a plan instructor configured to instruct a compute resource of the one or more compute resources to load data to a cache according to the cache assignment and the network bandwidth assignment.

2. The system of claim 1, wherein the future workload predictor is configured to identify the plurality of future jobs expected to execute on the one or more compute resources for a planning window.

3. The system of claim 1, wherein the cache assignment comprises a prefetch schedule, the prefetch schedule identifying a start time at which the prefetch dataset set should be obtained.

4. The system of claim 3, wherein the prefetch schedule further identifies a time at which the prefetch dataset should be evicted from the cache.

5. The system of claim 1, wherein the prefetch dataset is stored on one or more data stores located remotely from the one or more compute resources.

6. The system of claim 1, wherein the workload analyzer is configured to identify job characteristics for each of the plurality of previously executed jobs offline from a workload production.

7. The system of claim 1, wherein the cache manager further comprises:
   a file block determiner configured to:
      identify a file contained within each prefetch dataset, and
      identify a location of the file as one or more blocks of a data store; and
   wherein the plan instructor is configured to instruct the compute resource of the one or more compute resources to load data to the cache by obtaining the one or more blocks for the prefetch dataset according to the cache assignment and the network bandwidth assignment.

8. The system of claim 1, wherein the network bandwidth allocator is further configured to allocate a total available network bandwidth between the prefetch dataset and a non-prefetch dataset, the non-prefetch dataset comprising a dataset designated for obtaining during execution of one of the future jobs.

9. A method for prefetching data, comprising:
   identifying a plurality of previously executed jobs in a workload executing on one or more compute resources;
   identifying a plurality of future jobs expected to execute on the one or more compute resources based at least on the previously executed jobs;
   determining a cache assignment that identifies a prefetch dataset for at least one of the future jobs;
   determining a network bandwidth assignment for the prefetch dataset; and
   instructing a compute resource of the one or more compute resources to load data to a cache according to the cache assignment and the network bandwidth assignment.

10. The method of claim 9, wherein said identifying the plurality of future jobs comprises identifying the plurality of future jobs expected to execute on the one or more compute resources for a planning window.

11. The method of claim 9, wherein the cache assignment comprises a prefetch schedule, the prefetch schedule identifying a start time at which the prefetch dataset set should be obtained.

12. The method of claim 11, wherein the prefetch schedule further identifies a time at which the prefetch dataset should be evicted from the cache.

13. The method of claim 9, wherein the prefetch dataset is stored on one or more data stores located remotely from the one or more compute resources.

14. The method of claim 9, further comprising:
   identifying job characteristics for each of the plurality of previously executed jobs offline from a workload production.

15. The method of claim 9, wherein said determining the network bandwidth assignment comprises allocating a total available network bandwidth between the prefetch dataset and a non-prefetch dataset, the non-prefetch dataset comprising a dataset designated for obtaining during execution of one of the future jobs.

16. The method of claim 9, further comprising:
   instructing the compute resource to load data to the cache according to at least one of an updated cache assignment or an updated network bandwidth assignment.

17. A computer-readable memory having computer program code recorded thereon that when executed by at least one processor causes the at least one processor to perform a method comprising:
- identifying a plurality of previously executed jobs in a workload executing on one or more compute resources;
- identifying a plurality of future jobs expected to execute on the one or more compute resources based at least on the previously executed jobs;
- determining a cache assignment that identifies a prefetch dataset for at least one of the future jobs;
- determining a network bandwidth assignment for the prefetch dataset; and
- instructing a compute resource of the one or more compute resources to load data to a cache according to the cache assignment and the network bandwidth assignment.

18. The computer-readable memory of claim 17, wherein the cache assignment comprises a prefetch schedule, the prefetch schedule identifying a start time at which the prefetch dataset set should be obtained.

19. The computer-readable memory of claim 18, wherein the prefetch schedule further identifies a time at which the prefetch dataset should be evicted from the cache.

20. The computer-readable memory of claim 17, wherein said determining the network bandwidth assignment comprises:
- allocating a total available network bandwidth between the prefetch dataset and a non-prefetch dataset, the non-prefetch dataset comprising a dataset designated for obtaining during execution of one of the future jobs.

* * * * *